(12) United States Patent
Deshazer et al.

(10) Patent No.: US 8,995,814 B2
(45) Date of Patent: Mar. 31, 2015

(54) LIGHT GUIDE AND ASSOCIATED LIGHT ASSEMBLIES

(71) Applicant: Dow Corning Corporation, Midland, MI (US)

(72) Inventors: David J. Deshazer, Bay City, MI (US); Steven Swier, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 14/381,605

(22) PCT Filed: Mar. 14, 2013

(86) PCT No.: PCT/US2013/031259
§ 371 (c)(1),
(2) Date: Aug. 28, 2014

(87) PCT Pub. No.: WO2013/142243
PCT Pub. Date: Sep. 26, 2013

(65) Prior Publication Data
US 2015/0043241 A1 Feb. 12, 2015

Related U.S. Application Data

(60) Provisional application No. 61/613,118, filed on Mar. 20, 2012.

(51) Int. Cl.
*G02B 6/00* (2006.01)
*C08G 77/44* (2006.01)
(Continued)

(52) U.S. Cl.
CPC ............... *G02B 1/046* (2013.01); *G02B 1/045* (2013.01); *G02B 6/0006* (2013.01); *G02B 6/0008* (2013.01); *C08G 77/42* (2013.01); *G02B 6/0096* (2013.01)
USPC ............................ 385/141; 385/142; 525/477

(58) Field of Classification Search
None
See application file for complete search history.

(56) References Cited

U.S. PATENT DOCUMENTS 3,328,481 A * 6/1967 Vincent ......................... 525/477
3,576,905 A * 4/1971 Hartlein et al. ................. 528/34
(Continued)

FOREIGN PATENT DOCUMENTS

JP  2007332259  12/2007
JP  200925368   2/2009

*Primary Examiner* — Robert S Loewe
(74) *Attorney, Agent, or Firm* — Dow Corning Corporation

(57) ABSTRACT

A light guide has a transmission of greater than 90 percent, a refractive index greater than 1.4, and less than 10 haze percent. The light guide also includes an organosiloxane block copolymer having a weight average molecular weight of at least 20,000 g/mole. The organosiloxane block copolymer includes 40 to 90 mole percent disiloxy units of the formula $[R^1_2SiO_{2/2}]$ arranged in linear blocks each having an average of from 10 to 400 disiloxy units $[R^1_2SiO_{2/2}]$ per linear block, 10 to 60 mole percent trisiloxy units of the formula $[R^2SiO_{3/2}]$ arranged in non-linear blocks each having a weight average molecular weight of at least 500 g/mol, and 0.5 to 25 mole percent silanol groups $[\equiv SiOH]$. $R^1$ is independently a $C_1$ to $C_{30}$ hydrocarbyl and $R^2$ is independently a $C_1$ to $C_{20}$ hydrocarbyl. Moreover, at least 30% of the non-linear blocks are crosslinked with another non-linear block and aggregated in nano-domains.

19 Claims, 12 Drawing Sheets

(51) Int. Cl.
*C08G 77/48* (2006.01)
*G02B 1/04* (2006.01)
*C08G 77/42* (2006.01)
*F21V 8/00* (2006.01)

(56) References Cited

U.S. PATENT DOCUMENTS

| | | | | |
|---|---|---|---|---|
| 3,619,229 | A * | 11/1971 | Hartlein | 523/209 |
| 3,629,228 | A * | 12/1971 | Hartlein et al. | 528/17 |
| 3,647,846 | A * | 3/1972 | Hartlein et al. | 556/436 |
| 3,670,649 | A * | 6/1972 | Hartlein et al. | 102/431 |
| 4,013,611 | A * | 3/1977 | Hechtl et al. | 523/212 |
| 4,419,402 | A * | 12/1983 | Gutek | 442/145 |
| 4,443,502 | A * | 4/1984 | Gutek | 427/387 |
| 5,268,433 | A | 12/1993 | Ikeno et al. | |
| 6,144,795 | A | 11/2000 | Dawes et al. | |
| 6,511,615 | B1 | 1/2003 | Dawes et al. | |
| 7,312,008 | B2 * | 12/2007 | Wu et al. | 430/66 |
| 7,373,060 | B2 | 5/2008 | Satake et al. | |
| 7,807,736 | B2 | 10/2010 | Kashiwagi et al. | |
| 8,299,198 | B2 | 10/2012 | Manabe et al. | |
| 8,445,560 | B2 | 5/2013 | Lecomte et al. | |
| 8,487,020 | B2 | 7/2013 | Galeone et al. | |
| 2005/0180712 | A1 * | 8/2005 | Shelnut et al. | 385/129 |
| 2006/0035092 | A1 * | 2/2006 | Shimizu et al. | 428/447 |
| 2007/0196309 | A1 * | 8/2007 | Tarletsky et al. | 424/70.12 |
| 2009/0297461 | A1 * | 12/2009 | Perle et al. | 424/59 |
| 2010/0081748 | A1 * | 4/2010 | Taguchi et al. | 524/433 |
| 2010/0273927 | A1 * | 10/2010 | Taguchi et al. | 524/433 |
| 2011/0311723 | A1 | 12/2011 | Bekemeier et al. | |
| 2013/0168727 | A1 | 7/2013 | Horstman et al. | |
| 2013/0172496 | A1 * | 7/2013 | Horstman et al. | 525/477 |
| 2013/0245187 | A1 * | 9/2013 | Swier et al. | 524/500 |
| 2014/0031465 | A1 * | 1/2014 | Horstman et al. | 524/158 |

* cited by examiner

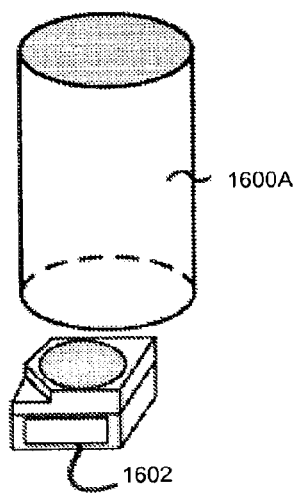 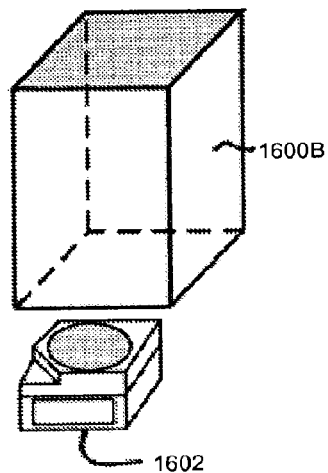 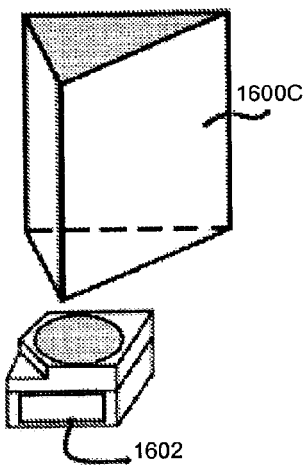
Figure 16A        Figure 16B        Figure 16C
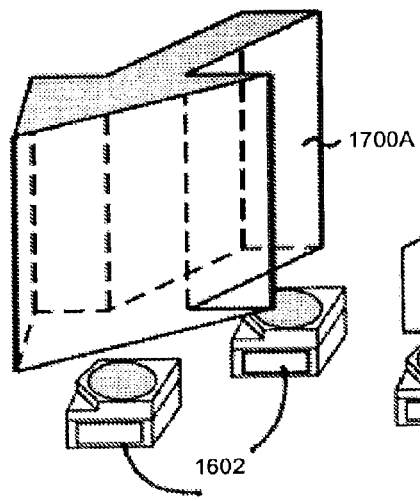 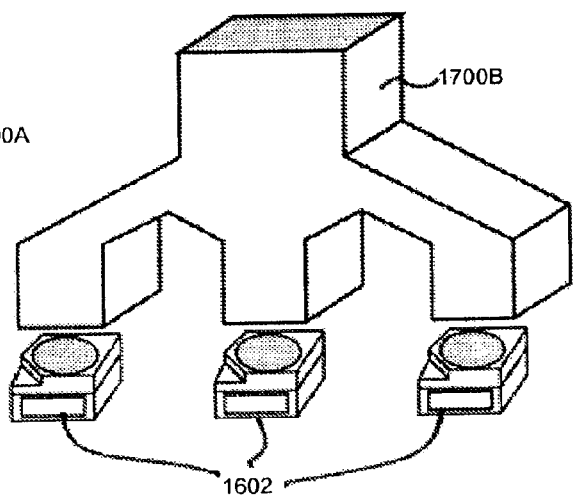
Figure 17A        Figure 17B

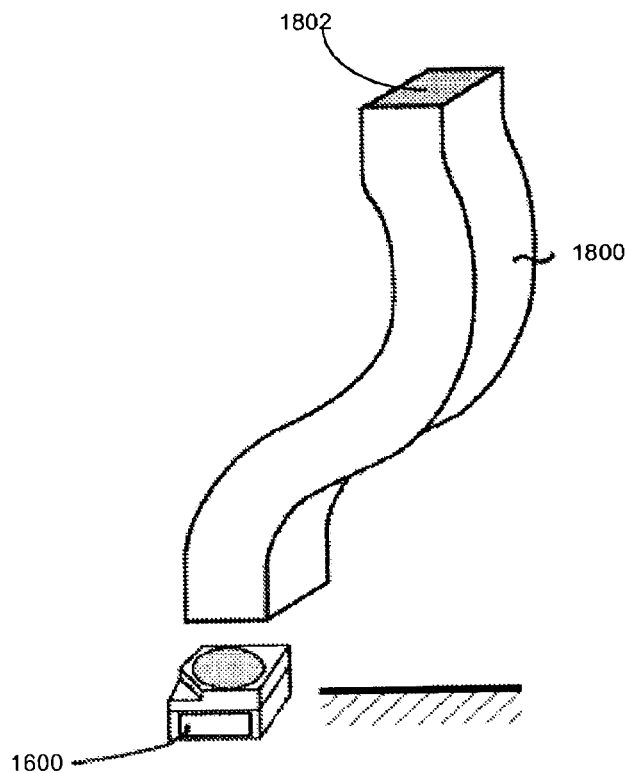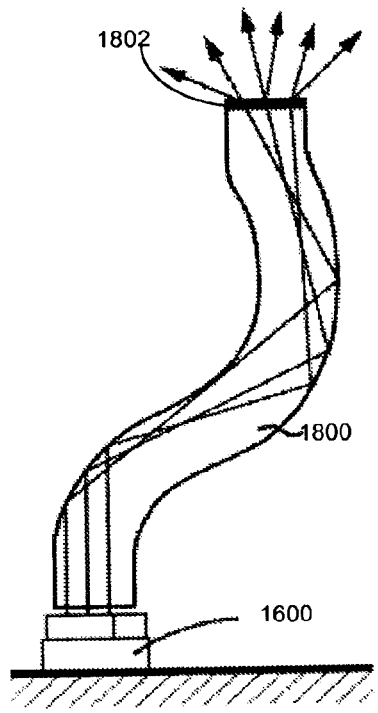
Figure 18A  Figure 18B
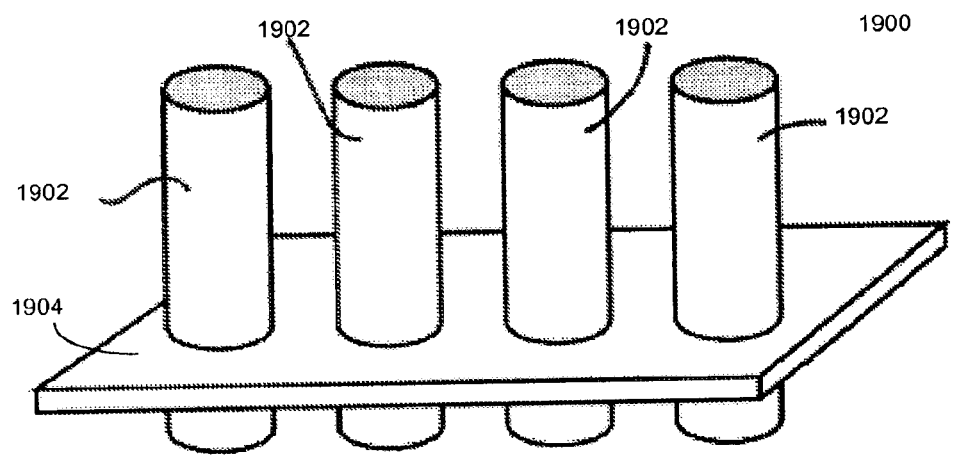
Figure 19

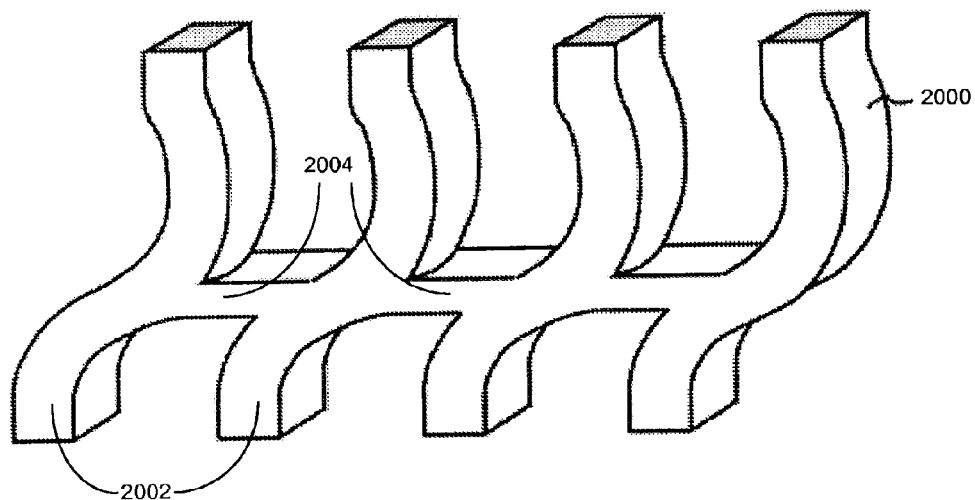
*Figure 20*
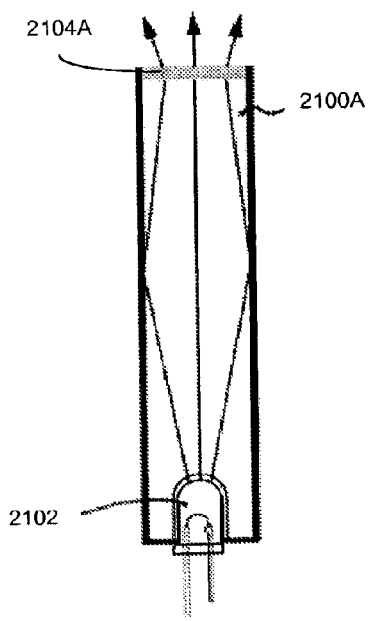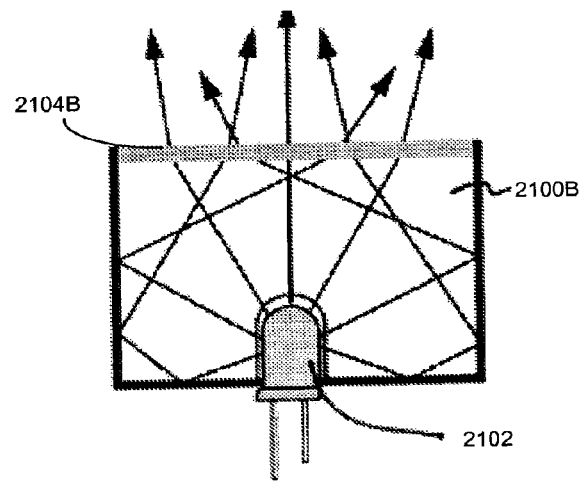
*Figure 21A*          *Figure 21B*

US 8,995,814 B2

LIGHT GUIDE AND ASSOCIATED LIGHT ASSEMBLIES

CROSS-REFERENCE TO RELATED APPLICATIONS

This application is a U.S. national stage filing under 35 U.S.C. §371 of PCT Application No. PCT/US13/31259 filed on Mar. 14, 2013, which claims the benefit of U.S. Provisional Patent Appl. Ser. No. 61/613,118, filed Mar. 20, 2012 under 35 U.S.C. §119 (e), the entire disclosures of which PCT Application No. PCT/US13/31259 and U.S. Provisional Patent Appl. Ser. No. 61/613,118 are incorporated by reference as if fully set forth herein.

FIELD OF THE DISCLOSURE

This disclosure generally relates to a light guide for transporting light from a light source to a point at a distance.

BACKGROUND OF THE DISCLOSURE

Light guides are employed for a range of functions including illumination, backlighting, signage and display purposes. Light guides may be constructed in a number of different ways including from an injection molded or machined transparent plastic component, such as poly(methyl methacrylate (PMMA), wherein a light source, such as a fluorescent lamp or a light emitting diode, is integrated, such as with a mechanical attachment. Light emitted from the light source is guided through the light guide by internal reflection. In various examples, the internal reflection is total internal reflection.

The better the coupling of the light source and the light guide, generally the better more efficient the transmittance of light from the light source to an opposing end of the light guide. In some applications, the light is emitted into the plane of the light guide to increase performance. In other applications, the length of the light guide is minimized to increase performance. However, minimizing the length of the light guide can also compromise light uniformity, e.g. by creation of dark spots and/or more intense areas of light near the light source.

In addition to producing light, light sources also produce heat. For this reason, many light guides are designed to be resistant to heat. However, in so doing, such light guides are sometimes bulky and heavy, thereby increasing production and manufacturing costs. In addition, the bulk of the light guides can adversely affect optical properties. Moreover, PMMA tends to physically degrade after heating/ageing. Accordingly, there is an opportunity to develop an improved light guide.

SUMMARY OF THE DISCLOSURE

This disclosure provides a light guide for transporting light from a light source to a point at a distance with minimal absorption loss. The light guide has a transmission of greater than 90 percent corrected for surface reflection, a refractive index greater than 1.4, and less than 10 haze percent. The light guide also includes an organosiloxane block copolymer having a weight average molecular weight of at least 20,000 g/mole. The organosiloxane block copolymer includes 40 to 90 mole percent disiloxy units of the formula [Rhu $1_2SiO_{2/2}$] arranged in linear blocks each having an average of from 10 to 400 disiloxy units [$R^1_2SiO_{2/2}$] per linear block. The organosiloxane block copolymer also includes 10 to 60 mole percent disiloxy units of the formula [$R^2SiO_{3/2}$] arranged in non-linear blocks each having a weight average molecular weight of at least 500 g/mol. Furthermore, the organosiloxane block copolymer includes 0.5 to 25 mole percent silanol groups [≡SiOH]. In these formulae, $R^1$ is independently a $C_1$ to $C_{30}$ hydrocarbyl and $R^2$ is independently a $C_1$ to $C_{20}$ hydrocarbyl. In addition, at least 30% of the non-linear blocks are crosslinked with another non-linear block and aggregated in nano-domains. Furthermore, each linear block is linked to at least one non-linear block. This disclosure also provides an article that includes a light source and the light guide disposed on the light source. The light guide of this disclosure has improved thickness control and can transport light from a light source to a point at a distance with minimal absorption loss. Moreover, the light guide can be formed efficiently and cost effectively. In addition, the light guide has low haze and excellent thermal stability and physical properties after heat ageing.

Embodiment 1 relates to a light assembly, comprising:
a light source; and
a light guide, comprising an organosiloxane block copolymer and having a first surface configured to receive light from the light source and a second surface configured to emit light transmitted along a length of the light guide;
wherein:
the organosiloxane block copolymer has a weight average molecular weight of at least 20,000 g/mole and comprises:
40 to 90 mole percent disiloxy units of the formula [$R^1_2SiO_{2/2}$] arranged in linear blocks each having an average of from 10 to 400 disiloxy units [$R^1_2SiO_{2/2}$] per linear block;
10 to 60 mole percent trisiloxy units of the formula [$R^2SiO_{3/2}$] arranged in non-linear blocks each having a weight average molecular weight of at least 500 g/mol; and
0.5 to 25 mole percent silanol groups [≡SiOH];
wherein each $R^1$, at each occurrence is independently a $C_1$ to $C_{30}$ hydrocarbyl and each $R_2$, at each occurrence, is independently a $C_1$ to $C_{20}$ hydrocarbyl,
wherein at least 30% of the non-linear blocks are crosslinked with another non-linear block and aggregated in nano-domains, and wherein each linear block is crosslinked to at least one non-linear block.

Embodiment 2 relates to the light assembly of Embodiment 1, wherein the first surface forms an indentation configured to admit, at least in part, the light source.

Embodiment 3 relates to the light assembly of any one of Embodiments 1 or 2, wherein the light source is in physical contact with the first surface.

Embodiment 4 relates to the light assembly of any one of Embodiments 1-3, wherein the light guide is formed into an irregular three-dimensional shape.

Embodiment 5 relates to the light assembly of Embodiment 4, wherein the irregular three-dimensional shape comprises a bend.

Embodiment 6 relates to the light assembly of any one of Embodiments 4 or 5, wherein the irregular three-dimensional shape comprises a prism.

Embodiment 7 relates to the light assembly of any one of Embodiments 4-6, wherein the irregular three-dimensional shape comprises a wedge.

Embodiment 8 relates to the light assembly of any one of Embodiments 4-7, wherein the irregular three-dimensional shape comprises a first cross section proximate the first surface and a second cross section proximate the second surface, the first cross section different from the second cross section.

Embodiment 9 relates to the light assembly of Embodiment 8, wherein at least one of the first cross section and the second cross section is at least one of circular and rectangular.

Embodiment 10 relates to the light assembly of any one of Embodiments 1-9, wherein the light guide comprises a plurality of first surfaces configured to receive light.

Embodiment 11 relates to the light assembly of Embodiment 10, further comprising a plurality of light sources.

Embodiment 12 relates to the light assembly of Embodiment 11, wherein each of the plurality of light sources is associated with one of the first surfaces.

Embodiment 13 relates to the light assembly of any one of Embodiments 1-10, further comprising a plurality of light sources configured to emit light received, at least in part, by the first surface.

Embodiment 14 relates to the light assembly of any one of Embodiments 1-13, further comprising a plurality of second surfaces configured to emit light transmitted a length of the light guide.

Embodiment 15 relates to the light assembly of any one of Embodiments 1-14, wherein the second surface is a diffused exit.

Embodiment 16 relates to the light assembly of Embodiment 15, wherein the diffused exit is formed by an etching process.

Embodiment 17 relates to the light assembly of any one of Embodiments 1-16, wherein the light guide has a thermal stability such that it has less than 5 wt. % total weight loss, over 700 minutes of exposure to 250° C. in an air atmosphere.

Embodiment 18 relates to the light assembly of any one of Embodiments 1-17, wherein the light guide has a transmission of greater than about 95 percent corrected for surface reflection, a refractive index greater than about 1.4, and less than about 10 haze percent.

Embodiment 19 relates to the light assembly of any one of Embodiments 1-18, wherein the light source comprises a light emitter and a protective member.

Embodiment 20 relates to the light assembly of Embodiment 19, wherein the protective member is comprised of the block copolymer.

Embodiment 21 relates to a light guide, comprising:
an organosiloxane block copolymer formed into an irregular three-dimensional shape having a first surface configured to receive light and a second surface configured to emit light transmitted a length of the light guide, the block copolymer having a thermal stability such that it has less than 5 wt. % total weight loss, over 700 minutes of exposure to 250° C. in an air atmosphere, a transmission of greater than about 95 percent corrected for surface reflection, a refractive index greater than about 1.4, and less than about 10 haze percent; wherein:
the organosiloxane block copolymer has a weight average molecular weight of at least 20,000 g/mole and comprises:
40 to 90 mole percent disiloxy units of the formula $[R^1_2SiO_{2/2}]$ arranged in linear blocks each having an average of from 10 to 400 disiloxy units $[R^1_2SiO_{2/2}]$ per linear block;
10 to 60 mole percent trisiloxy units of the formula $[R^2SiO_{3/2}]$ arranged in non-linear blocks each having a weight average molecular weight of at least 500 g/mol; and
0.5 to 25 mole percent silanol groups [≡SiOH];
   wherein each $R^1$, at each occurrence is independently a $C_1$ to $C_{30}$ hydrocarbyl and each $R_2$, at each occurrence, is independently a $C_1$ to $C_{20}$ hydrocarbyl,
   wherein at least 30% of the non-linear blocks are crosslinked with another non-linear block and aggregated in nano-domains, and
   wherein each linear block is linked to at least one non-linear block.

Embodiment 22 relates to the light guide of Embodiment 21, wherein the irregular three-dimensional shape comprises a bend.

Embodiment 23 relates to the light guide of any one of Embodiments 21 or 22, wherein the irregular three-dimensional shape comprises a prism.

Embodiment 24 relates to the light assembly of any one of Embodiments 21-23, wherein the irregular three-dimensional shape comprises a wedge.

Embodiment 25 relates to the light assembly of any one of Embodiments 21-24, wherein the irregular three-dimensional shape comprises a first cross section proximate the first surface and a second cross section proximate the second surface, the first cross section different from the second cross section.

Embodiment 26 relates to the light guide of Embodiment 25, wherein at least one of the first cross section and the second cross section are at least one of a circular cross section and a rectangular cross section.

Embodiment 27 relates to the light assembly of any one of Embodiments 21-26, wherein the light guide comprises a plurality of first surfaces configured to receive light.

Embodiment 28 relates to the light assembly of Embodiment 27, further comprising a plurality of light sources.

Embodiment 29 relates to the light assembly of Embodiment 28, wherein each of the plurality of light sources is associated with one of the first surfaces.

Embodiment 30 relates to the light assembly of any one of Embodiments 21-29, further comprising a plurality of light sources configured to emit light received, at least in part, by the first surface.

Embodiment 31 relates to the light assembly of any one of Embodiments 21-30, further comprising a plurality of second surfaces configured to emit light transmitted a length of the light guide.

Embodiment 32 relates to the light assembly of any one of Embodiments 21-31, wherein the second surface is a diffused exit.

Embodiment 33 relates to the light assembly of Embodiment 32, wherein the diffused exit is formed by an etching process.

Embodiment 34 relates to the light assembly of Embodiment 21, wherein said organosiloxane block copolymer comprises a gradient of disiloxy units and trisiloxy units.

Embodiment 35 relates to the light assembly of Embodiment 21, wherein said organosiloxane block copolymer comprises a gradient of disiloxy units, trisiloxy units, and silanol groups.

Embodiment 36 relates to the light assembly of Embodiment 21, wherein said organosiloxane block copolymer comprises a gradient of trisiloxy units and silanol groups.

Embodiment 37 relates to the light assembly of Embodiment 21, wherein said organosiloxane block copolymer comprises a gradient of disiloxy units and silanol groups.

Embodiment 38 relates to the light guide of any one of Embodiments 34-37, wherein said disiloxy units have the formula $[(CH_3)(C_6H_5)SiO_{2/2}]$.

Embodiment 39 relates to the light guide of any one of Embodiments 34-37, wherein said organosiloxane block copolymer comprises at least 30 weight percent disiloxy units.

Embodiment 40 relates to the light guide of any one of Embodiments 34-39, wherein $R^2$ is phenyl.

Embodiment 41 relates to the light guide of any one of Embodiments 21-40, wherein said organosiloxane block copolymer has a tensile strength greater than 1.0 MPa and a % elongation at break greater than 20%, each independently determined according to ASTM D412.

Embodiment 42 relates to the light guide of any one of Embodiments 21-41, wherein said organosiloxane block copolymer has a melt flow temperature of from 25° C. to 200° C.

Embodiment 43 relates to the light guide of any one of Embodiments 21-42, wherein said organosiloxane block copolymer has:

a storage modulus (G') at 25° C. of from 0.01 MPa to 500 MPa and a loss modulus (G") at 25° C. of from 0.001 MPa to 250 MPa;

a storage modulus (G') at 120° C. of from 10 Pa to 500,000 Pa and a loss modulus (G") at 120° C. of from 10 Pa to 500,000 Pa; or a storage modulus (G') at 200° C. of from 10 Pa to 100,000 Pa and a loss modulus (G") at 200° C. of from 5 Pa to 80,000 Pa.

Embodiment 44 relates to an article comprising a light source and a light guide disposed on said light source, said light guide having a transmission of greater than 90 percent corrected for surface reflection, a refractive index greater than 1.4, and less than 10 haze percent, and comprising an organosiloxane block copolymer having a weight average molecular weight of at least 20,000 g/mole and comprising:

40 to 90 mole percent disiloxy units of the formula $[R^1{}_2SiO_{2/2}]$ arranged in linear blocks each having an average of from 10 to 400 disiloxy units $[R^1{}_2SiO_{2/2}]$ per linear block;

10 to 60 mole percent trisiloxy units of the formula $[R^2SiO_{3/2}]$ arranged in non-linear blocks each having a weight average molecular weight of at least 500 g/mol; and 0.5 to 25 mole percent silanol groups [≡SiOH];

wherein $R^1$ is independently a $C_1$ to $C_{30}$ hydrocarbyl and $R^2$ is independently a $C_1$ to $C_{20}$ hydrocarbyl, wherein at least 30% of the non-linear blocks are crosslinked with another non-linear block and aggregated in nano-domains, and wherein each linear block is linked to at least one non-linear block.

Embodiment 45 relates to the article of Embodiment 44, wherein said organosiloxane block copolymer comprises a gradient of disiloxy units and trisiloxy units.

Embodiment 46 relates to the article of Embodiment 44, wherein said organosiloxane block copolymer comprises a gradient of disiloxy units, trisiloxy units, and silanol groups Embodiment 47 relates to the article of Embodiment 44, wherein said organosiloxane block copolymer comprises a gradient of trisiloxy units and silanol groups.

Embodiment 48 relates to the article of Embodiment 44, wherein said organosiloxane block copolymer comprises a gradient of disiloxy units and silanol groups.

Embodiment 49 relates to the article of any one of Embodiments 44-48, wherein said disiloxy units have the formula $[(CH_3)(C_6H_5)SiO_{2/2}]$.

Embodiment 50 relates to the article of any one of Embodiments 44-48, wherein said organosiloxane block copolymer comprises at least 30 weight percent disiloxy units.

Embodiment 51 relates to the article of any one of Embodiments 44-48, wherein $R^2$ is phenyl.

Embodiment 52 relates to a method for making the light assembly of any one Embodiments 1-20.

Embodiment 53 relates to a method for making the light guide of any one of Embodiments 21-51.

DESCRIPTION OF THE FIGURES

Other advantages of the present disclosure will be appreciated, as the same becomes better understood by reference to the following detailed description when described in connection with the accompanying Figures wherein:

FIGS. 16A-16C are perspective views of three variously irregularly-shaped light guides.

FIGS. 17A and 17B are perspective views of two variously irregularly-shaped light guides.

FIGS. 18A and 18B are a perspective view and a schematic view, respectively, of a serpentine, rectangular light guide.

FIG. 19 is a perspective view an array of four light guides.

FIG. 20 is a perspective view of an array of a four serpentine sub-members.

FIGS. 21A and 21B are schematics of light passage through two examples of light guides.

DETAILED DESCRIPTION OF THE DISCLOSURE

Figure 1A:
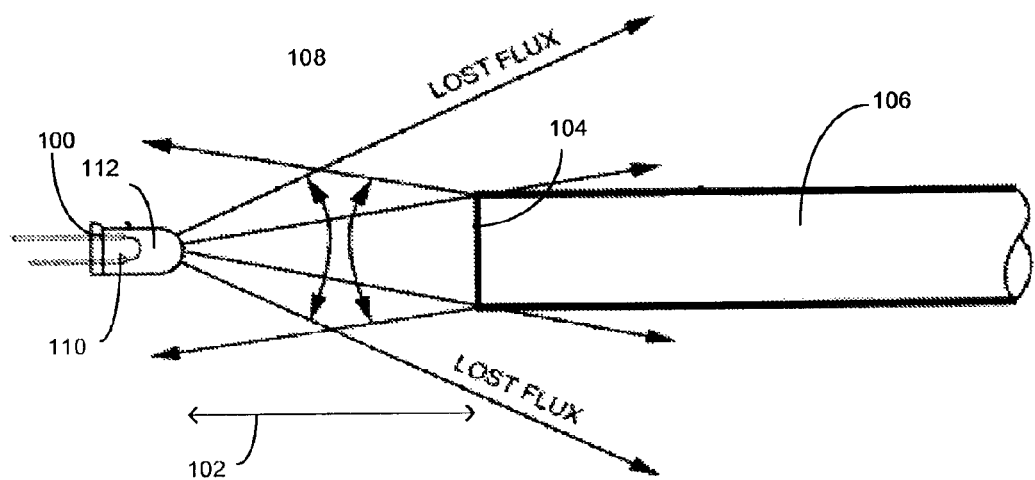
FIG. 1A is an illustration of lost flux from a light source.

Light Source:

The light sources described herein are not particularly limited and may include or be a light emitting member that may be further defined as a solid state light, a light emitting diode (LED), a fluorescent light, an incandescent light, a halogen light, etc. The LED is not particularly limited and may be further described as one or more of semiconductor LEDs, organic LEDs, polymer LEDs, quantum dot LEDs, infrared LEDs, visible light LEDs (including colored and white light), ultraviolet LEDs, and combinations thereof. Additionally, LEDs and other solid state lights that emit light along a variety of axes, i.e., light sources that emit light laterally or perpendicularly. For instance, a surface emitting laser (SEL) that emits light on the Z-axis may be incorporated. The light source may also include one or more components known in the art as typically associated with solid state lights, such as LEDs. For example, the light source may include one or more drivers, optics, heat sinks, housings, lenses, power supplies, fixtures, wires, electrodes, circuits, and the like.

The light sources disclosed herein may variously incorporate a protective member configured to insulate or otherwise protect the light emitting member against environmental conditions and, in certain examples, regulate the emission of light from the light source as a whole. The protective member may be a structure such as a glass bulb or other glass structure such as is well known in fluorescent, incandescent, halogen lights and certain LEDs and other solid state lights. Alternatively, the protective member may be an encapsulant configured to encapsulate solid state lights. In various examples, the encapsulant may be of the same or similar organosiloxane block copolymers disclosed herein. Other protective members are contemplated. However, in all cases of light sources that include a protective member, the protective members may be understood to be an integral component of the light source and structurally and mechanically separate and distinct from the light guides. In various examples in which the protective member is made of the organosiloxane block copolymer disclosed herein, the protective member may be from approximately one (1) or fewer millimeters thick to approximately one (1) centimeter thick. Light sources that emit light laterally may not require encapsulant or may utilize a comparatively thin phosphor layer in lieu of an encapsulant.

Light Guide:

The light guides described herein may be made from or otherwise incorporate the organosiloxane block copolymers disclosed herein. Such block copolymers may have a thermal stability that allows the resultant light guides to be in relatively close proximity to or in direct contact with various light sources without experiencing thermal degradation. Consequently, the light guides disclosed herein may have a transmission of greater than about ninety-five (95) percent corrected for surface reflection, a refractive index greater than about 1.4, and less than ten (10) haze percent while being able to maintain those properties over time even with a light source in close proximity of or in direct contact with the light guide. While the light guides disclosed herein may be made from or otherwise incorporate such block copolymers, it is to be understood that the light guides may be made from any material with suitable light transmission properties and thermal stability (e.g., materials that exhibit minimal total weight loss, such as less than 5 wt. % total weight loss, over 700 minutes of exposure to 250° C. and in an air atmosphere). Such materials are disclosed in WO2012/040453, which is incorporated by reference as if fully set forth herein.

The light guides described herein are not limited in size or shape and may be a sheet, a film, a plate, or have any of a variety of geometrical shape. The light guides may have uniform dimensions or non-uniform dimensions in whole or in-part. In various embodiments, the light guides (and/or individual sheets or shapes thereof) has a thickness of from 10 µm to 2 mm, from 10 µm to 1 mm, from 10 µm to 0.5 mm, from 10 µm to 100 µm, from 50 µm to 100 µm, from 10 µm to 50 µm, from 10 µm to 90 µm, from 20 µm to 80 µm, from 30 µm to 70 µm, from 40 µm to 60 µm, or of about 50 µm.

The light guides disclosed herein may have any of a variety of lengths suitable to the purpose for which the light guide is intended. For instance, a light guide may be utilized over relatively short distances for data communication between closely spaced electronic components and, as such, may be one (1) centimeter or less in length. Alternatively, the light guide may be utilized to transmit light over long distances, such as multiple kilometers.

The various light guides may provide relatively efficient flux coupling to transport light from the light source into the light guide with relatively low absorption loss, to provide relatively high transmission of light through the light guide to an exit, and/or to provide relatively high light exit from the light guide with relatively low absorption loss. The light guide generally, and in particular cross-section may be made in any of a variety of shape, cylindrical (oval), rectangular (square), conical (increasing in size from entrance end to exit end), or any special shape (e.g. arrow, star shaped, quarter moon, etc.). For rectangular and special shapes with corners, the corners may have a radius greater than 0.5 mm to maximize illumination in the corners. The shape of the light guide may gradually change along its length, i.e. from circular at the entrance end to accommodate the lamp, to square at the exit end. The shape of the light guide may be regular or irregular, symmetrical or asymmetrical, geometric or non-geometric, etc.

FIG. 1A is an illustration of lost flux from a light source 100. In various examples, the light source 100 is an LED lamp, though any of a variety of light sources known in the art may be utilized herein. As illustrated, the light source 100 is positioned at a distance 102 from a proximal end 104 of a light guide 106. In various examples, owing to the distance 102, flux 108 may be lost through reflection off of the proximal end 104 of the light guide 106 or though the emitted light not being incident on the proximal end 104 of the light guide 106 at all.

The light source 100 includes a light emitter 110 and a protective member 112. The light emitter 110 may be the LED itself or whatever lighting technology is being utilized in particular circumstances. The protective member 112 may be of the same or different material as the light guide 106 but is mechanically and physically distinct from the light guide 106.

Figure 1B:
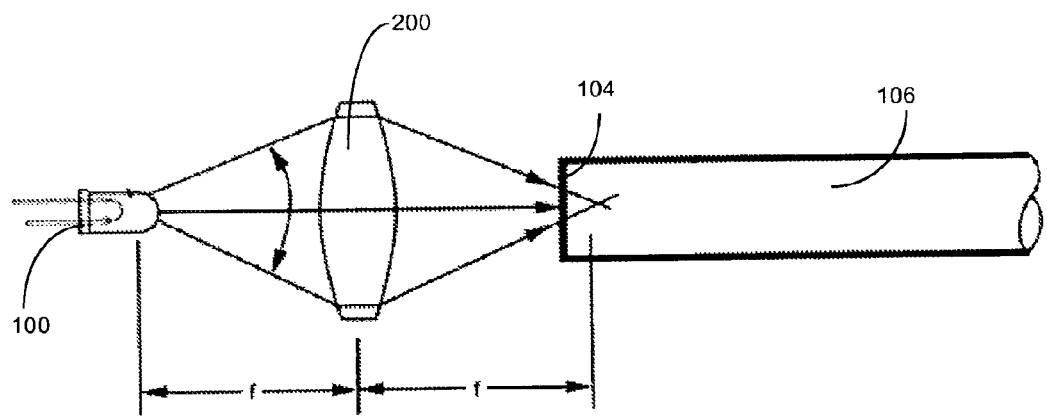
FIG. 1B is a schematic of an LED lamp generating light passing through a lens and into a light guide.

FIG. 1B is an illustration of an LED lamp generating light passing through a lens 200 and into a light guide 106. The loss of flux with respect to the illustration of FIG. 1A may be addressed by focusing the light emitted from the light source 100 with the lens so that the light impacts the proximal end 104 of the light guide 106.

Figure 2:
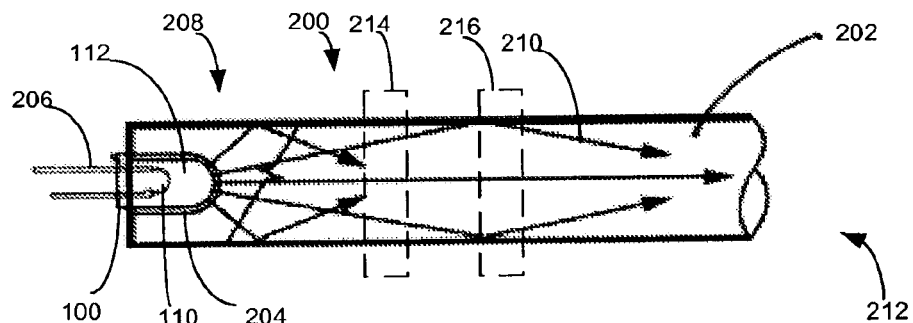
FIG. 2 is a schematic of a light assembly including a light source disposed within a light guide.

FIG. 2 is a schematic of a light assembly 200 including a light source 100 disposed within a light guide 202. In various examples, the light guide 202 may be formed from any material that has a transmission of greater than about ninety-five (95) percent corrected for surface reflection, a refractive index greater than about 1.4, and less than ten (10) haze percent while being able to maintain those properties over time even with the light source 100 being disposed within the light guide 202. In an example, the light guide 202 is formed substantially or entirely of organosiloxane block copolymer s as disclosed herein.

As illustrated, the light guide 202 includes an indentation or cavity 204 in which the light source 100 is or may be seated. The cavity 204 may make light guide 202 an irregular three-dimensional shape. Electrical contacts 206 of the light source 100 extend outside of the proximal end 208 of the light guide 202. As illustrated, with the light source 100 seated in the light guide 202, the light 210 emitted from the light source 100 is totally or essentially totally internally reflected and transmitted to the distal end 212 of the light source 100.

As illustrated, the protective member 112 is in physical contact with the light guide 202 but remains physically and mechanically distinct from the light guide 202. Alternatively, a gap may be disposed between the protective member 112 and the light guide 202 but the light source 100 may still be at least partially within the indentation 204. The protective member 112 may be fabricated as part of the light source 100 and without respect to the fabrication of the light guide 202. In various examples, the mechanical distinction between the protective member 112 may be observed by disassembling the light assembly 200, in which the protective member 112 may remain associated with the light source 100 while the light guide 202 may be separated from the light source 100. In various examples, the protective member 112 and the light guide 202 are comprised of the organosiloxane block copolymers disclosed herein.

In an alternative example, the light source 100 may not include a protective member 112. In such an example, the light emitter 110 may be positioned with respect to the light guide 202. In such an example, the light guide 202 may not provide the same degree of protection against environmental conditions as may be expected of the protective member 110. Further, disassembly of the light assembly 200 may mechanically separate the light guide 202 from the light emitter 110.

Optionally, the light guide 202 includes a refractive index gradient between a first region 214 and a second region 216. In various examples, the gradient in the refractive index may be produced by methods disclosed in detail herein. The gradient may be continuous between the regions 214, 216, may be abrupt at a point between the regions 214, 216, or a combination thereof.

Figure 3:
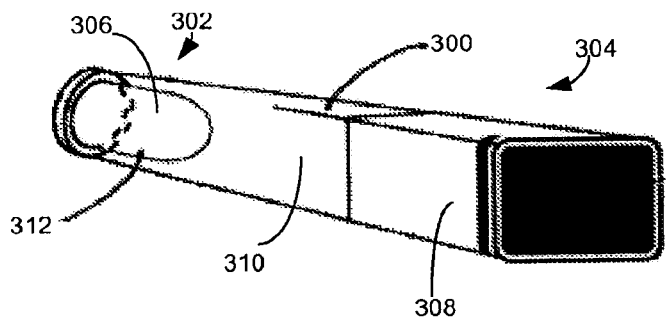
FIG. 3 is a perspective view of a light guide.

FIG. 3 is a perspective view of a light guide 300. As illustrated, the light guide 300 has a circular cross section at the proximal end 302 and a rectangular profile at the distal end 304, resulting in an irregular three-dimensional shape. As illustrated, the light guide 300 includes a first region 306 having the circular cross section, a second region 308 having the rectangular cross section, and a transition region 310 in which the circular cross section gradually evolves into the rectangular cross section over the length of the transition region 310. In various examples, the light guide 300 does not have the first and second regions 306, 308 and instead gradually evolves from the proximal end 302 to the distal end 304.

Figure 4:
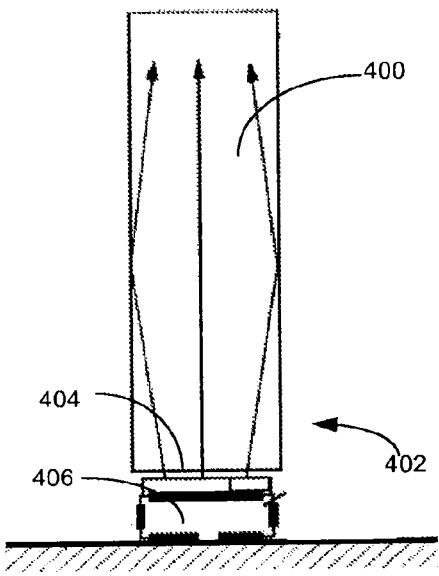
FIG. 4 is a schematic of a light guide including a proximal end having a substantially smooth, flat surface.

The light guide 300 may be formed according to any of a number of processes, including extrusion, molding, and the like. The light guide 300 includes an indentation or cavity 312 into which a light source, such as the light source 100 (not pictured), may be seated. FIG. 4 is a schematic of a light guide 400 including a proximal end 402 having a substantially smooth, flat surface 404. As illustrated, the light guide 400 is in close proximity of a light source 406, such that alternative materials for light sources known in the art may degrade from absorbed heat from the light source 406. In an example, the light source 406 is a coherent light source, such as a laser, and directs light substantially directly into the surface 404, where the light is substantially or entirely internally reflected within the light guide 400. In such an example, though not necessarily limited only to coherent light sources 406, the light guide 400 may efficiently transmit the light from the light source 406 notwithstanding the light source 406 being positioned at some distance from the light guide 400.

Figure 5:
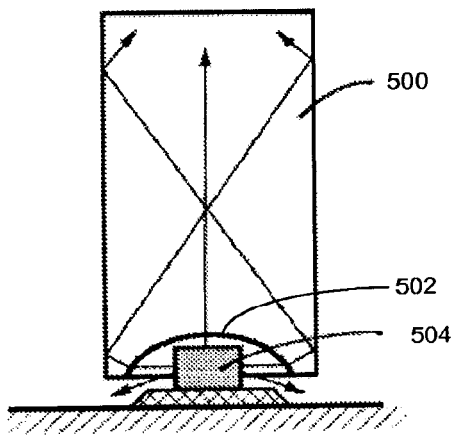
FIG. 5 is a schematic of a light guide including a smooth, concave end.

FIG. 5 is a schematic of a light guide 500 including a smooth, concave end 502. As illustrated, the light source 504 is positioned within the indentation or cavity 502 but spatially separated from and not in physical contact with the light guide 500. In the illustrated example, the light source 504 is an incoherent light source and emits light multidirectionally. In the illustrated example, the light emitted from the light source 504 is substantially but not entirely captured by the light guide 500.

Figure 6:
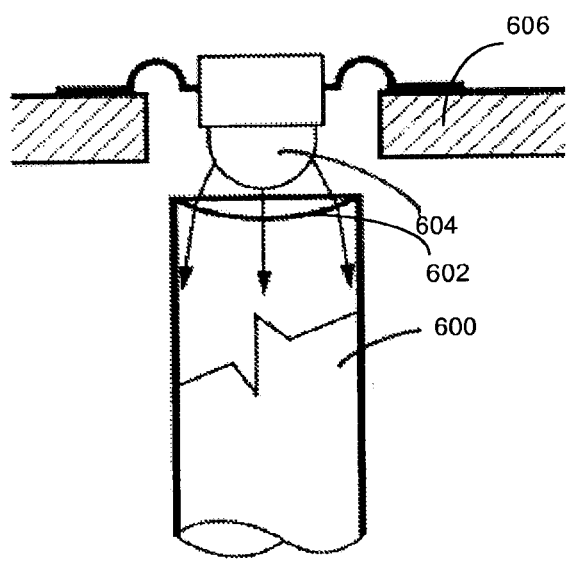
FIG. 6 is a schematic of a light guide including a concave end.

FIG. 6 is a schematic of a light guide 600 including a concave end 602. In various examples, the concave end 602 may be configured to enhance flux coupling and light capture from the light source 604 in comparison with a light source with a flat surface. As illustrated, the light source 604 is electrically and mechanically coupled to a substrate 606. As illustrated, the light source 604 is not in physical contact with the light guide 600.

Figure 7:
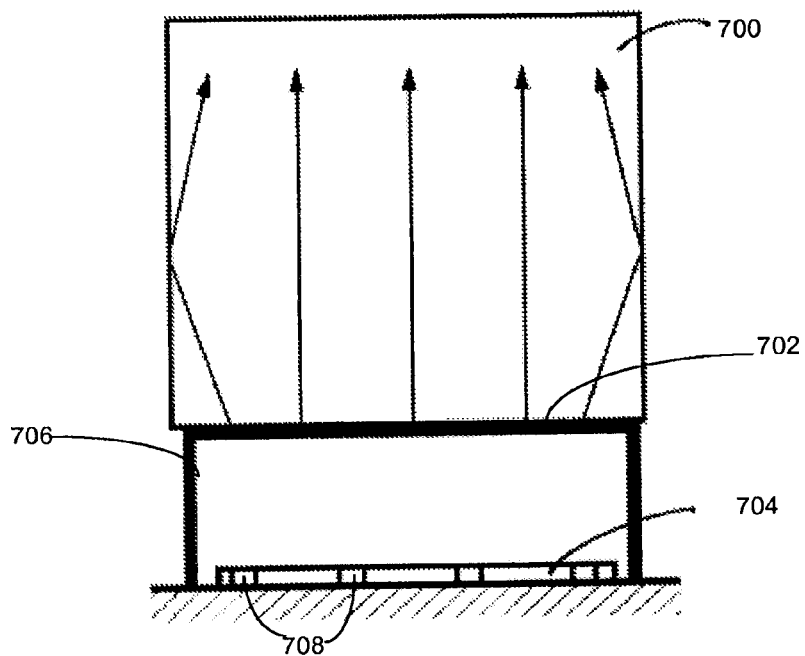
FIG. 7 is a schematic of a light guide including a smooth, flat entrance end positioned over a light source.

FIG. 7 is a schematic of a light guide 700 including a smooth, flat entrance end 702 positioned over a light source 704. As illustrated, the light source is positioned within a light emitting assembly 706, such as a protective member, configured to secure the light source 704 and provide isolation, at least in part, from environmental conditions. The light source 704 as illustrated includes multiple light emitting elements 708, such as LEDs.

Figure 8:
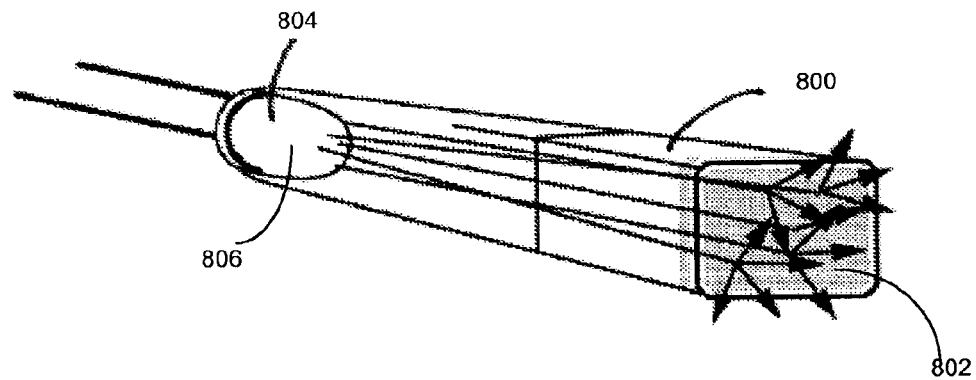
FIG. 8 is a schematic of a light guide.

FIG. 8 is a schematic of a light guide 800. The light guide 800 may be similar or identical to the light guide 300, further including a diffused exit end 802, resulting in the scattering of light emitted from the end 802 of the light guide 800. As illustrated, the light source 804 is disposed within an indentation or cavity 806 within the light guide 800.

Figure 9:
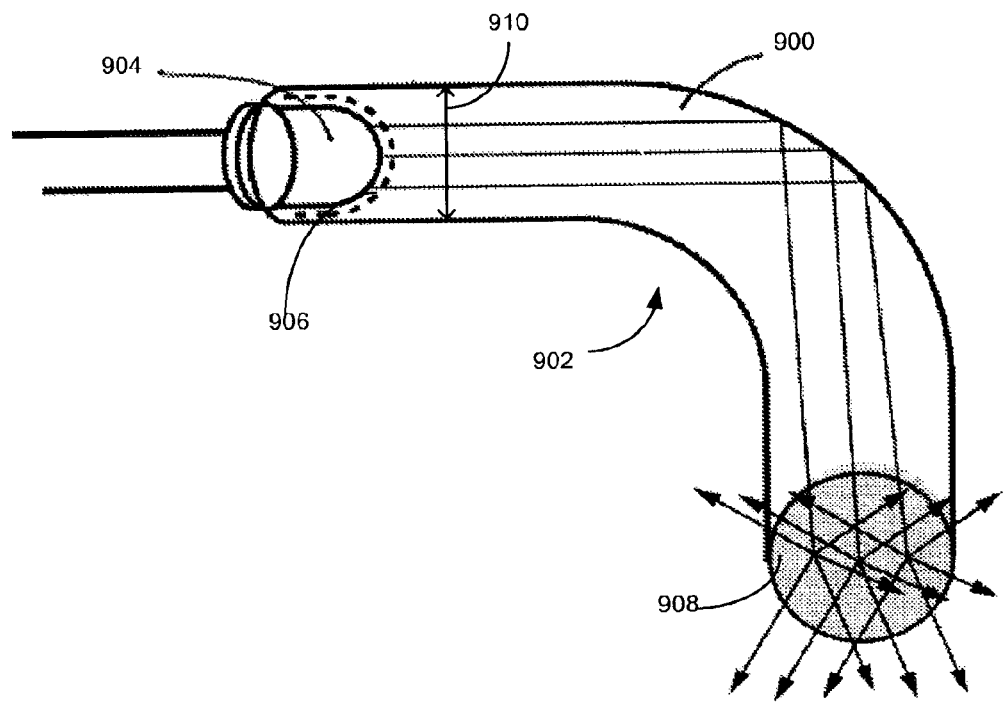
FIG. 9 is a schematic of a light guide incorporating a bend.

FIG. 9 is a schematic of a light guide 900 incorporating a bend 902, such as a ninety (90) degree bend. While a ninety (90) degree bend 902 is illustrated, it is to be understood that the light guide 900 may be formed with any of a variety of bend angles. As illustrated, a light source 904 is seated within an indentation or cavity 906 in the light guide and the light guide 900 includes and a diffused exit end 908.

As illustrated, the bend radius is equal to or greater than twice the diameter 910 of the light guide 900. Examples in which the light guide does not include a circular profile may have a bend radius of equal to or greater than twice a thickness of the light guide. As illustrated, the configuration may produce relatively less light loss than a bend radius that is less than twice the diameter of the light guide. However, it is to be understood that light guides with a bend radius of less than twice the diameter 910 or thickness of the light guide are affirmatively utilized in certain examples.

Figure 10:
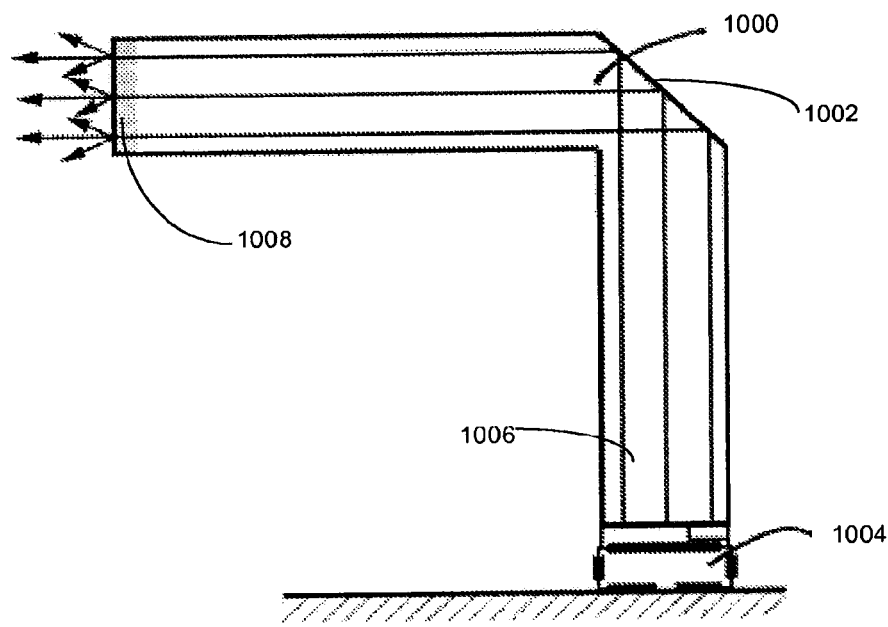
FIG. 10 is a schematic of a light guide including a forty-five (45) degree prism reflector.

FIG. 10 is a schematic of a light guide 1000 including a forty-five (45) degree prism reflector 1002. The prism reflector 1002 may produce relatively sharp internal reflection and redirection of light within the light guide 1000. A light source 1004 is positioned in contact with the proximal end 1006 of the light guide 1000. The distal end 1008 includes a diffused exit.

Figure 11A:
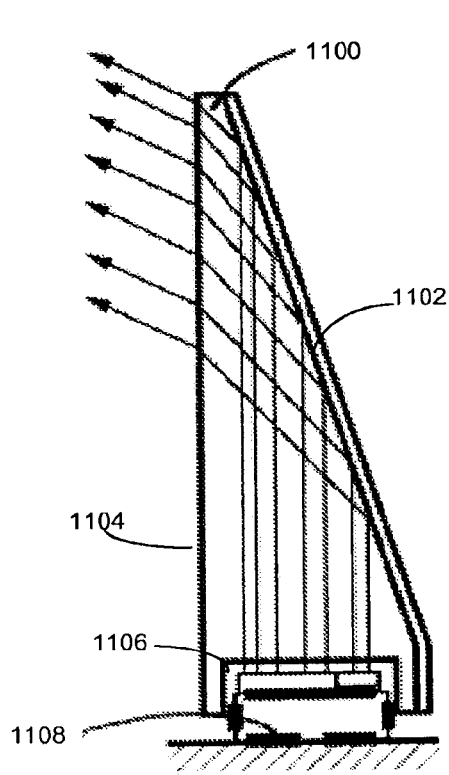
FIGS. 11A-B are schematics of wedge-planar light guides.

FIG. 11A is a schematic of a wedge-planar light guide 1100 including a substantially planar surface 1102 that generally reflects light out of a light emitting surface 1104. In various examples, the planar surface 1102 provides a generally uniform distribution of emitted light. As illustrated, the light guide 1100 includes an indentation or cavity 1106 configured to seat a light source 1108.

Figure 11B:
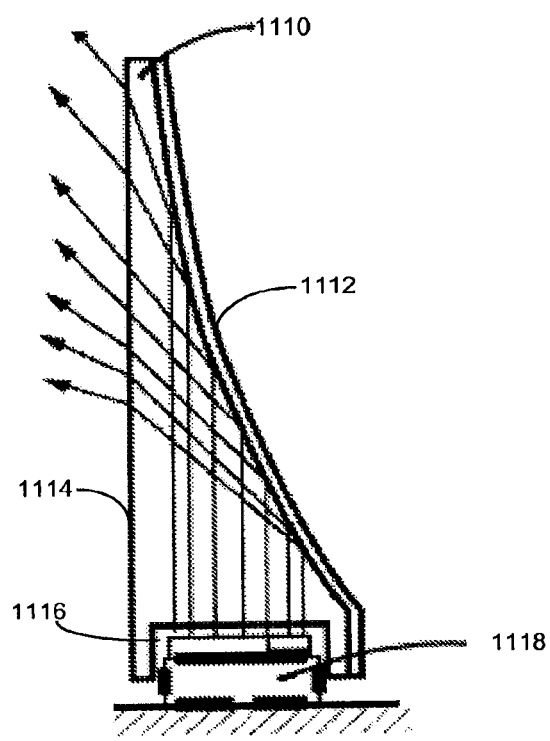

FIG. 11B is a schematic of a wedge-curved light guide 1110 including a substantially curved surface 1112 that generally reflects light out of a light emitting surface 1114. As illustrated, the curved surface 1112 provides a generally logarithmic distribution of emitted light. As illustrated, the light guide 1110 includes an indentation or cavity 1116 configured to seat a light source 1118.

Figure 12:
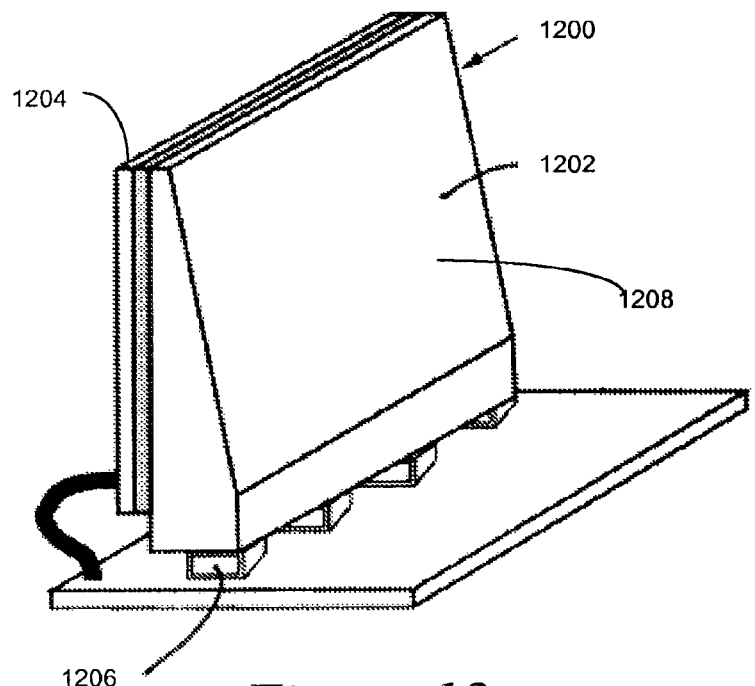
FIG. 12 is a perspective view of a transreflective liquid crystal display (LCD).

FIG. 12 is a perspective view of a transreflective liquid crystal display (LCD) 1200 As illustrated, the LCD 1200 utilizes a wedge-planar light guide 1202 to backlight a screen 1204. As illustrated, the light guide 1202 does not include any indentation to seat multiple light sources 1206. The substantially planar surface 1208 is configured to reflect light out of the light emitting screen 1204.

Figure 13:
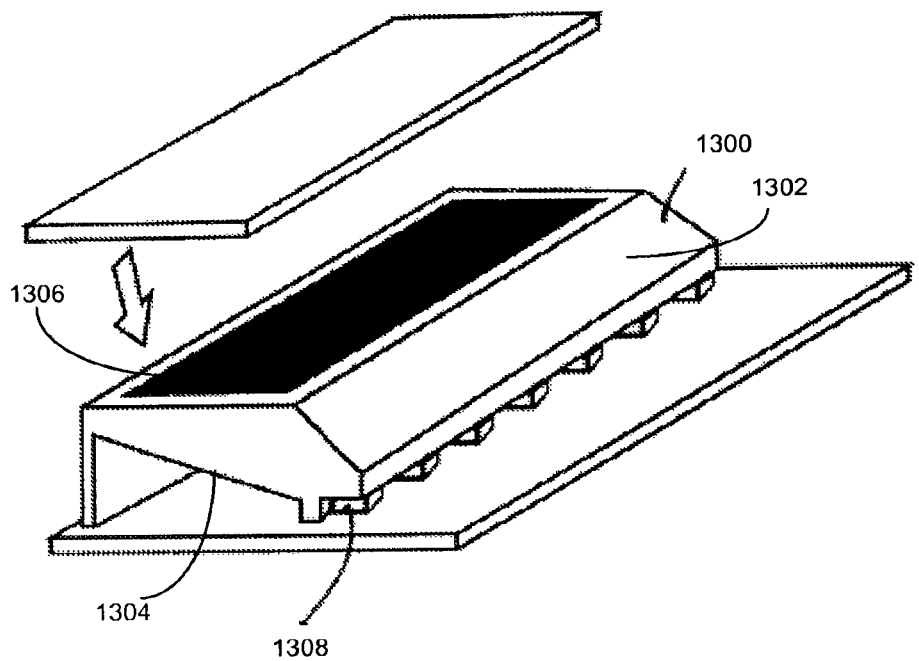
FIG. 13 is a perspective view of a right angle planar wedge light guide.

FIG. 13 is a perspective view of a right angle planar wedge light guide 1300. The light guide 1300 utilizes two reflecting surfaces 1302, 1304 and a diffusing surface 1306 to direct diffuse light substantially parallel to the emission of light from the light sources 1308.

Figure 14:
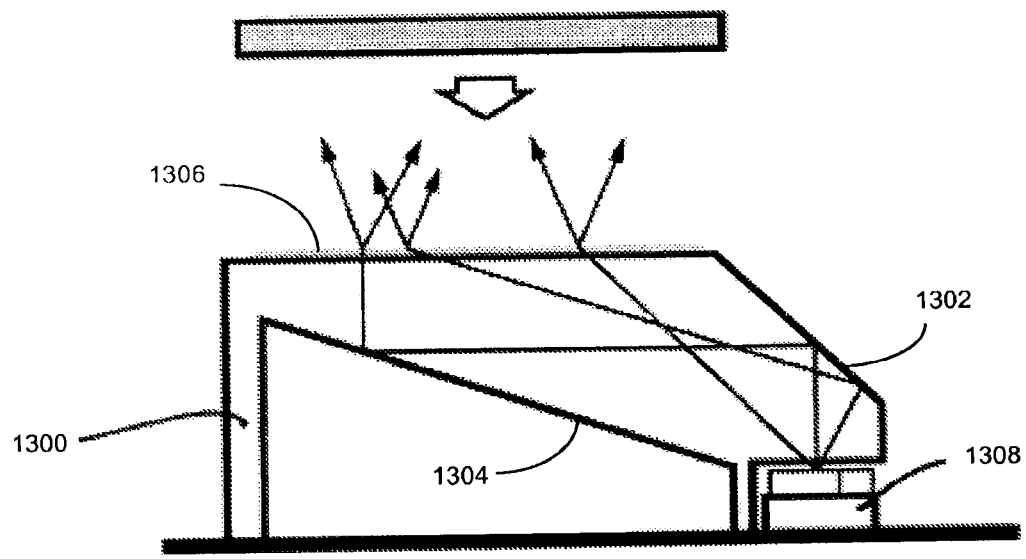
FIG. 14 is a side view of an the right angle planar wedge light guide.

FIG. 14 is a side view of an the right angle planar wedge light guide 1300.

Figure 15:
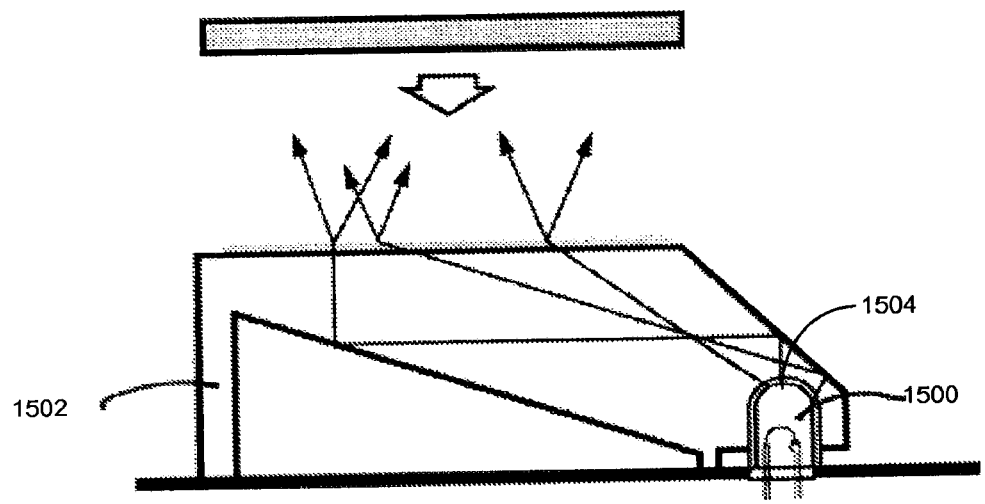
FIG. 15 is a schematic of a light source disposed in a right angle planar light guide.

FIG. 15 is a schematic of a light source 1500 disposed in a right angle planar light guide 1502. The light guide 1502 may include an indentation or cavity 1504 configured to seat the light source 1500.

FIGS. 16A-16C are perspective views of three variously irregularly-shaped light guides 1600A, 1600B, 1600C disposed over three independent light sources 1602.

FIGS. 17A and 17B are perspective views of two variously irregularly-shaped light guides 1700A, 1700B disposed over multiple light sources 1602.

FIGS. 18A and 18B are a perspective view and a schematic view, respectively, of a serpentine, rectangular light guide 1800. As illustrated, the light guide 1800 includes a diffusing surface 1802.

FIG. 19 is a perspective view an array 1900 of four light guides 1902. The light guides 1902 are generally tubular. The light guides 1902 are secured with by a support structure 1904. The support structure 1904 may various be made of the same material as the light guides 1902 or by an alternative material configured to secure the light guides 1902.

FIG. 20 is a perspective view of an array 2000 of a four serpentine sub-members 2002. The light guides 2002 include securing members 2004 formed from the same material as the light guides 2002. As illustrated, the array 2000 is a unitary structure.

FIGS. 21A and 21B are schematics of light passage through two examples of light guides 2100A, 2100B, each including a light source 2102 disposed therein. As illustrated, the light guides 2100A, B are narrow and wide, respectively, and include a diffusing surface 2104A, B. As illustrated, the wide light guide 2100B may diffuse light more widely than the narrow light guide 2100A.

Figure 22A:
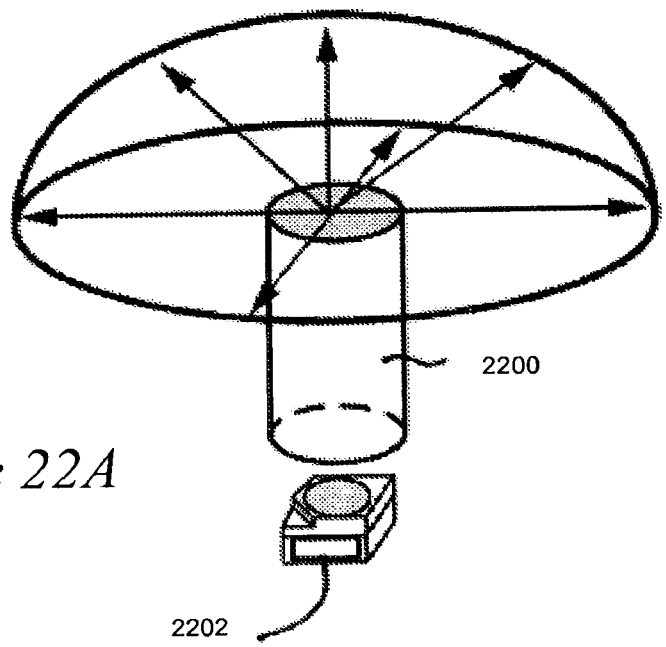
FIGS. 22A and 22B are schematic views of wide and narrow radiation patterns emerging from a light guide.
Figure 22B:
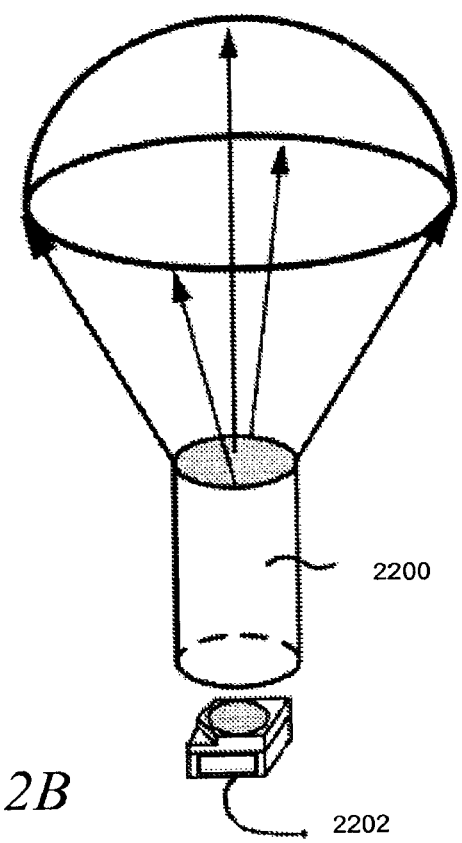

FIGS. 22A and 22B are schematic views of wide and narrow radiation patterns emerging from a light guide disposed 2200 over a light source 2202.

It noted that the Figures illustrate various combinations of light sources and light guides. The illustrated examples are not limiting, and various combinations of light guides and light sources may be formed between and among the illustrated examples. The light guides disclosed herein may be irregularly shaped, in that the shape of the light guide may be other than as a sheet or other conventional three-dimensional form. In various examples, light guides with bends, curves, prisms, wedges, supporting structures, variant cross sections, and/or indentations or cavities as illustrated herein may be understood to have irregular three-dimensional shapes, among other irregular shapes known in the art.

As illustrated above, flux from the light source may be coupled to an entrance end of a light guide to permit light capture (i.e., to permit light to enter the light guide) with relatively minimal absorption loss before the light can be effectively transmitted and utilized in comparison with light guides known in the art. Most typically, flux coupling and capture may be comparatively effective when the light source is disposed near the light guide or disposed within the light guide. In various examples, the further away the light source is disposed from the light guide, the less effective the flux coupling becomes.

As illustrated, in various examples, the light source is disposed external to the light guide and effective flux coupling and light capture may occur when a pattern of radiation from the light source matches an acceptance pattern angle of the light guide. As illustrated with respect to FIG. 1B, a lens may also be used for flux coupling to focus flux from the light source onto an entrance end of the light guide. As illustrated in various examples, the light source may be disposed within the light guide. Flux capture may be total or near total due to the elimination or minimizing of Fresnel losses owing, in part, to the material of the various light guides.

In various illustrated examples, the light guides have one or more sides parallel to the direction of light traveling from the light source. The one or more sides may be smooth or substantially smooth to affect total or substantially total internal reflection. One or more sides of the light guide may include a paint or other coating to increase internal reflection and to reflect diagonal rays less than a critical angle that may otherwise allow such rays to escape the light guide.

As illustrated, the light guides may have one or more entrance ends (e.g., a proximal end) and one or more exit ends (e.g., a distal end), where light from the light source enters and exits, respectively. One or more entrance and or exit ends of the light guide may be smooth, contoured, or otherwise shaped to promote light capture from various light sources, allowing light rays to enter the light guide in a way that may minimize reflection and scatter and to exit the light guide as desired. The exit end of the light guide may variously be smooth, contoured, or diffused. A diffused exit end may have random critical angles across a surface to provide a high probability light rays can escape, and also to promote scattering of light rays producing a wide radiation pattern.

As illustrated, the light guide may be bent or curved. In an example, the bend radius is equal to or greater than two thicknesses or twice the diameter of the light guide. Such a configuration may produce relatively less light loss than a bend radius that is less than twice the diameter of the light guide. The light ray reflections may follow a smooth contour of a radius bend with little or no loss. As illustrated, sharp right angle direction changes may be achieved by using a reflective prism design as illustrated in FIG. 10.

The various light guides disclosed herein may be formed according to various processes. In an example, the light guides are melt-processed from organosiloxane block copolymers disclosed in detail herein. The organosiloxane block copolymers may be melted from a variety of starting forms, including pellet, spheroid, ribbon, sheet, cube, powder (e.g., a powder having an average particle size of not more than 500 µm, including a powder having an average particle size of from about 5 to about 500 µm; from about 10 to about 100 µm; from about 10 to about 50 µm; from about 30 to about 100 µm; from about 50 to about 100 µm; from about 50 to about 250 µm; from about 100 to about 500 µm; from about 150 to about 300 µm; or from about 250 to about 500 µm), flake, tablet, etc. The light guides may have features etched into or otherwise included within the material of the light guide itself. In various examples, the indentation and the diffused surfaces may be formed by an etching process.

Another example of how the light guides may be formed is by the formation of films of organosiloxane block copolymer. Such films may be cast from solutions of the organosiloxane block copolymers in an organic solvent and allowing the solvent to evaporate. Such films can have a range of thicknesses, e.g. from about 20 microns to about 2 mm; about 30 microns to about 1 mm; or about 40 microns to about 800 microns. The film can be prepared from any method that removes the solvent and generates a solid form, e.g. a film. For example, the film can be formed by using slot die coating, gravure coating, roll-to-roll processing techniques, etc. Such roll-to-roll techniques (hot embossing) can also be used to form light extraction features on the light guide. Such light extraction features can also be printed, scribed, etc., onto the light guide.

Organosiloxane Block Copolymer:

The light guide includes an organosiloxane block copolymer and the terminology "light guide" and "organosiloxane block copolymer" may be used, in some embodiments, interchangeably with one another. The organosiloxane block copolymer may be described as a solid composition. The solid composition may have two glass transition temperatures ($T_g$), one associated with soft block components and one associated with hard block components. As used herein, $T_g$ may be assessed using a differential scanning calorimeter (DSC). For example, a TA Instruments Q2000 (DSC) may be used to measure the glass transition ($T_g$). In some examples, a 10 mg sample is heated at 20° C./min using helium as a purge gas (25 mL/min). The $T_g$ may be calculated using the step midpoint at half extrapolated tangents. In some examples, the higher of the two glass transition temperatures of the solid composition is from −30 to 200, from 0 to 130, from 25 to 150, or from 40 to 120° C. At temperatures above this higher of the two glass transition temperatures, the solid composition softens and may flow. In various embodiments, the lower of the two glass transition temperatures of the solid composition is from −130° C. to 25° C., from −130° C. to 0° C., or from −130° C. to −10° C.

Referring back to the organosiloxane block copolymer, this copolymer may also be described as a "resin-linear" organosiloxane block copolymer.

In some embodiments, the organosiloxane block copolymers described herein have a weight average molecular weight ($M_w$) of at least 20,000 g/mole, alternatively a weight average molecular weight of at least 40,000 g/mole, alternatively a weight average molecular weight of at least 50,000 g/mole, alternatively a weight average molecular weight of at least 60,000 g/mole, alternatively a weight average molecular weight of at least 70,000 g/mole, or alternatively a weight average molecular weight of at least 80,000 g/mole. In some embodiments, the organosiloxane block copolymers described herein have a weight average molecular weight ($M_w$) of from about 20,000 g/mole to about 250,000 g/mole or from about 100,000 g/mole to about 250,000 g/mole, alternatively a weight average molecular weight of from about 40,000 g/mole to about 100,000 g/mole, alternatively a weight average molecular weight of from about 50,000 g/mole to about 100,000 g/mole, alternatively a weight average molecular weight of from about 50,000 g/mole to about 80,000 g/mole, alternatively a weight average molecular weight of from about 50,000 g/mole to about 70,000 g/mole, alternatively a weight average molecular weight of from about 50,000 g/mole to about 60,000 g/mole. In other embodiments, the weight average molecular weight of the organosiloxane block copolymers described herein is from 40,000 to 100,000, from 50,000 to 90,000, from 60,000 to 80,000, from 60,000 to 70,000, of from 100,000 to 500,000, of from 150,000 to 450,000, of from 200,000 to 400,000, of from 250,000 to 350,000, or from 250,000 to 300,000, g/mole. In still other embodiments, the organosiloxane block copolymer has a weight average molecular weight of from 40,000 to 60,000, from 45,000 to 55,000, or about 50,000, g/mole. The weight average molecular weight may be determined using Gel Permeation Chromatography (GPC) techniques.

In some embodiments, the light guide (and, e.g., the organosiloxane block copolymer) has a transmission of greater than 90, 90.5, 91, 91.5, 92, 92.5, 93, 9.5, 94, 94.5, 95, 95.5, 96, 96.5, 97, 97.5, 98, 98.5, 99, or 99.5, percent corrected for surface reflection as determined using ASTM E-903-96 or a modified version of ASTM D1003, which specifies how to measure light transmittance using a CIE Class C light source.

In the modified version, the class C light source is replaced with a broadband UV-Vis-NIR light source and monochromator as part of an integrating sphere spectrophotometer. An example of an integrating sphere spectrophotometer is the Varian Cary 5000 with a measurement range of 200-1700 nm. In the modified version, the transmission measurement is corrected for reflection losses by the following procedure. Measurements for total transmission $T_t$, including direct and diffuse transmission, total reflection $R_t$ including spectral and diffuse reflection are used to calculate absorption A by A=1−$T_t$−$R_t$. A corrected reflection $R_C$ due to a single pass through the sample is calculated using the formula:

$$R_c = \frac{-(1 + T_t^2 + 2R_t - R_t^2) + \sqrt{(1 + T_t^2 + 2R_t - R_t^2)^2 + 4(R_t - 2)R_t}}{2(R_t - 2)}$$

The corrected transmission $T_C$ is then calculated using the following formula:

$$T_c = 1 - \frac{[(R_c * A) - A]}{[(R_c * A) + R_c - 1]}$$

The light guide may also have a refractive index greater than 1.4, 1.44, 1.5, or alternatively greater than 1.55, as determined using ASTM D542. In some embodiments, the light guide has a refractive index greater than 2.5. In other embodiments, the solid composition has a refractive index of from about 1.4 to about 2.5, e.g., from about 1.5 to about 2.5; from about 1.7 to about 2.4; from about 1.4 to about 1.7; or from about 1.9 to about 2.3. The refractive index may be determined using a Metricon 2010 prism coupler, using a HeNe laser source at 632.8 nm, and operating in 'bulk index' mode. The light guide may also exhibit a haze percent, which represents the degree of scattering, of less than 10, 9, 8, 7, 6, 5, 4, 3, 2, or 1, as determined using ASTM D1003. The light guide may also exhibit a tensile strength at break (MPa) of from about 0.5 to about 50, from about 1 to about 10. The aforementioned values can apply to various non-limiting embodiments before and/or after heat ageing of the light guide, e.g., at 225° C. for about 1000 hours.

The light guide may also have an initial tensile strength at break greater than 1.0 MPa, alternatively greater than 1.5 MPa, alternatively greater than 2 Mpa, alternatively greater than 10 Mpa, alternatively greater than 20 Mpa, alternatively greater than 30 MPa, or alternatively greater than 40 MPa. In some embodiments, the solid compositions may have an initial tensile strength for from 1.0 MPa to about 50 MPa, e.g., from about 1.5 MPa to about 10 MPa, from about 2 MPa to about 10 MPa, from about 5 MPa to about 10 Mpa, from about 7 MPa to about 10 Mpa, from about 10 MPa to about 50 MPa or from about 25 MPa to about 50 MPa. In some embodiments, the solid compositions may have a % elongation at break (or rupture) greater than 40%, alternatively greater than 50%, or alternatively greater than 75%. In some embodiments, the solid compositions may have a % elongation at break (or rupture) of from about 20% to about 90%, e.g., from about 25% to about 50%, from about 20% to about 60%, from about 40% to about 60%, from about 40% to about 50%, or from about 75% to about 90%. As used herein, tensile strength and % elongation at break are measured according to ASTM D412.

The light guide may retain certain physical properties such as tensile strength and % elongation at break, upon heat aging.

In one embodiment, the tensile strength of the light guide remains within 20%, alternatively within 10%, or alternatively within 5% of its original value upon heat aging at, e.g., at 225° C. for about 1000 hours. In some embodiments, the tensile strength of the light guide remains within from about 20% to about 1% of its original value, e.g., from about 10% to about 1%, from about 10% to about 5% or from about 5% to about 1% of its original value upon heat aging at, e.g., at 225° C. for about 1000 hours. In some embodiments, heat aging may be conducted by heating samples within an air circulating oven at elevated temperatures and for an extended period of time (e.g., about 150-300° C. for about 50 to about 10,000 hours). In some embodiments, the tensile strength of the light guide remains within about 1% or remains the same as its original value upon heat aging at, e.g., at 225° C. for about 1000 hours. In other embodiments, the % elongation at break is at least 10%, alternatively 50%, or alternatively 75% upon heat aging at 200° C. for 1000 hours. In some embodiments, the % elongation at break is from about 10% to about 90%, e.g., from about 10% to about 50%, from about 25% to about 60%, from about 40% to about 60% or from about 50% to about 75% upon heat aging at 200° C. for 1000 hours.

In one embodiment, the light guide may be described as "melt processable." In this embodiment, the light guide may exhibit fluid behavior at elevated temperatures, e.g., upon "melting" or heating above the $T_g$. The melt flow temperature may be determined by measuring the storage modulus (G'), loss modulus (G") and tan delta (tan δ) as a function of temperature storage using commercially available instruments. For example, a commercial rheometer (such as TA Instruments' ARES-RDA with 2KSTD standard flexural pivot spring transducer, with forced convection oven) may be used to measure the storage modulus (G'), loss modulus (G") and tan delta as a function of temperature. Test specimens (e.g., 8 mm wide, 1 mm thick) may be loaded in between parallel plates and measured using small strain oscillatory rheology while ramping the temperature in a range from 25° C. to 300° C. at 2° C./min (frequency 1 Hz). The flow onset may be calculated as the inflection temperature in the G' drop (e.g. flow), the viscosity at 120° C. is reported as a measure for melt processability and the cure onset is calculated as the onset temperature in the G' rise (e.g., cure). In some embodiments, the FLOW of the light guide will also correlate to the glass transition temperature of the non-linear segments (i.e., the resin component) in the light guide. Alternatively, the "melt processability," the extent of cure, and/or the rate of cure of the light guide may be determined by rheological measurements at various temperatures. In a further embodiment, the light guide may have a melt flow temperature of from 25° C. to 200° C., alternatively from 25° C. to 160° C., or alternatively from 50° C. to 160° C.

In various embodiments, the light guide has a storage modulus (G') at 25° C. of from 0.01 MPa to 500 MPa and a loss modulus (G") of from 0.001 MPa to 250 MPa, alternatively a storage modulus (G') at 25° C. of from 0.1 MPa to 250 MPa and a loss modulus (G") of from 0.01 MPa to 125 MPa, alternatively a storage modulus (G') at 25° C. of from 0.1 MPa to 200 MPa and a loss modulus (G") of from 0.01 MPa to 100 MPa. In other embodiments, the light guide has a storage modulus (G') at 120° C. of from 10 Pa to 500,000 Pa and a loss modulus (G") of from 10 Pa to 500,000 Pa, alternatively a storage modulus (G') at 120° C. of from 20 Pa to 250,000 Pa and a loss modulus (G") of from 20 Pa to 250,000 Pa, alternatively a storage modulus (G') at 120° C. of from 30 Pa to 200,000 Pa and a loss modulus (G") of from 30 Pa to 200,000 Pa. In still other embodiments, the light guide has a storage modulus (G') at 200° C. of from 10 Pa to 100,000 Pa and a loss modulus (G") of from 5 Pa to 80,000 Pa, alternatively a storage modulus (G') at 200° C. of from 20 Pa to 75,000 Pa and a loss modulus (G") of from 10 Pa to 65,000 Pa, alternatively a storage modulus (G') at 200° C. of from 30 Pa to 50,000 Pa and a loss modulus (G") of from 15 Pa to 40,000 Pa. Melt processability may enable reflow of the organosiloxane block copolymer/light guide around various device architectures, e.g., after an initial coating or after the organosiloxane block copolymer is disposed on the device. This feature may be beneficial to various encapsulated electronic devices.

In some embodiments, the time to reach tan delta=1 of the light guide is from about 3 to about 5 hours at 150° C., e.g., from about 3 to about 5 minutes at 150° C., from about 10 to about 15 minutes at 150° C., from about 10 to about 12 minutes at 150° C., from about 8 to about 10 minutes at 150° C., from about 30 minutes to about 2.5 hours at 150° C., from about 1 hour to about 4 hours at 150° C. or from about 2.5 hours to about 5 hours at 150° C. In other embodiments, the tan delta=1 is from about 3 to about 60 seconds at 150° C., e.g., from about 3 to about 30 seconds at 150° C., from about 10 to about 45 seconds at 150° C., from about 5 to about 50 seconds at 150° C., from about 10 to about 30 seconds at 150° C. or from about 30 seconds to about 60 seconds at 150° C. In still other embodiments, the tan delta=1 is from about 5 to about 1200 seconds at 120° C., e.g., from about 20 to about 60 seconds at 120° C., from about 20 to about 600 seconds at 120° C., from about 60 to about 1200 seconds at 120° C., from about 5 to about 100 seconds at 120° C., from about 10 to about 60 seconds at 120° C. or from about 30 seconds to about 60 seconds at 120° C.

In some embodiments, the light guide has a viscosity greater than 100 cSt at 120° C. or greater than 1000 cSt at 120° C., greater than 5000 cSt at 120° C. or greater than 10,000 cSt at 120° C., and, in some instances, may have an infinite viscosity. In some embodiments, the solid composition has a viscosity of from about 100 cSt to about 10,000 cSt at 120° C.; e.g., from about 1000 cSt to about 5000 cSt at 120° C.; from about 500 cSt to about 2000 cSt at 120° C.; from about 2000 cSt to about 5000 cSt or from about 5000 cSt to about 10,000 cSt at 120° C.

In some embodiments, the light guide has one or more, in some cases all, of the following characteristics: resists yellowing; resists light absorption losses; has increased toughness; has excellent thermal stability; exhibits excellent flexibility in processing (e.g., B-staged films can be pre-cured, but can re-flow after curing); and/or exhibits adhesion to numerous types of surfaces, in some cases, without a need for adhesion promoters. In addition, the light guide of some of the embodiments described herein can maintain its refractive index even when its mechanical properties are manipulated and customized. Moreover, PDMS resin-linears may be utilized wherein the linear and the resin block have refractive indices that are dissimilar (e.g., RI Me$_2$-D=1.41 and RI Ph-T=1.56). Furthermore, the light guide can be tailored to have a (high) refractive index which may be matched or similar to a refractive index of a superstrate such as front glass, which increases efficiency. Moreover, the solid composition, in some embodiments, offers excellent melt flowability simultaneously with shelf stability.

The organosiloxane block copolymer of the examples described herein are referred to as "resin-linear" organosiloxane block copolymers and include siloxy units independently selected from $(R_3SiO_{1/2})$, $(R_2SiO_{2/2})$, $(RSiO_{3/2})$, or $(SiO_{4/2})$ siloxy units, where R may be any organic group. These siloxy units are commonly referred to as M, D, T, and Q units respectively. These siloxy units can be combined in various manners to form cyclic, linear, or branched structures. The chemical and physical properties of the resulting polymeric structures vary depending on the number and type of siloxy units in the organopolysiloxane. For example, "linear" organopolysiloxanes may contain mostly D, or ($R_2SiO_{2/2}$) siloxy units, which results in polydiorganosiloxanes that are fluids of varying viscosities, depending on the "degree of polymerization" or DP as indicated by the number of D units in the polydiorganosiloxane. "Linear" organopolysiloxanes may have glass transition temperatures ($T_g$) that are lower than 25° C. "Resin" organopolysiloxanes result when a majority of the siloxy units are selected from T or Q siloxy units. When T siloxy units are predominately used to prepare an organopolysiloxane, the resulting organosiloxane is often referred to as a "resin" or a "silsesquioxane resin". Increasing the amount of T or Q siloxy units in an organopolysiloxane may result in polymers having increasing hardness and/or glass like properties. "Resin" organopolysiloxanes thus have higher $T_g$ values, for example siloxane resins often have $T_g$ values greater than 40° C., e.g., greater than 50° C., greater than 60° C., greater than 70° C., greater than 80° C., greater than 90° C. or greater than 100° C. In some embodiments, $T_g$ for siloxane resins is from about 60° C. to about 100° C., e.g., from about 60° C. to about 80° C., from about 50° C. to about 100° C., from about 50° C. to about 80° C. or from about 70° C. to about 100° C.

As described herein, "organosiloxane block copolymers" or "resin-linear organosiloxane block copolymers" (the terms are used interchangeably herein) refer to organopolysiloxanes containing "linear" D siloxy units in combination with "resin" T siloxy units. In some embodiments, the organosiloxane copolymers are "block" copolymers, as opposed to "random" copolymers. As such, the "resin-linear organosiloxane block copolymers" described herein refer to organopolysiloxanes containing D and T siloxy units, where the D units (i.e., [$R^1_2SiO_{2/2}$] units) are primarily bonded together to form polymeric chains having, in some embodiments, an average of from 10 to 400 D units (e.g., an average of from about 10 to about 350 D units; about 10 to about 300 D units; about 10 to about 200 D units; about 10 to about 100 D units; about 50 to about 400 D units; about 100 to about 400 D units; about 150 to about 400 D units; about 200 to about 400 D units; about 300 to about 400 D units; about 50 to about 300 D units; about 100 to about 300 D units; about 150 to about 300 D units; about 200 to about 300 D units; about 100 to about 150 D units, about 115 to about 125 D units, about 90 to about 170 D units or about 110 to about 140 D units), which are referred herein as "linear blocks".

The T units (i.e., [$R^2SiO_{3/2}$]) are primarily bonded to each other to form branched polymeric chains, which are referred to as "non-linear blocks". In some embodiments, a significant number of these non-linear blocks may further aggregate to form "nano-domains" when solid forms of the block copolymer are provided. In some embodiments, these nano-domains form a phase separate from a phase formed from linear blocks having D units, such that a resin-rich phase forms. In some embodiments, the disiloxy units [$R^1_2SiO_{2/2}$] are arranged in linear blocks having an average of from 10 to 400 disiloxy units [$R^1_2SiO_{2/2}$] per linear block (e.g., an average of from about 10 to about 400 D units; about 10 to about 300 D units; about 10 to about 200 D units; about 10 to about 100 D units; about 50 to about 400 D units; about 100 to about 400 D units; about 150 to about 400 D units; about 200 to about 400 D units; about 300 to about 400 D units; about 50 to about 300 D units; about 100 to about 300 D units; about 150 to about 300 D units; about 200 to about 300 D units; about 100 to about 150 D units, about 115 to about 125 D units, about 90 to about 170 D units or about 110 to about 140 D units), and the trisiloxy units [$R^2SiO_{3/2}$] are arranged in non-linear blocks having a molecular weight of at least 500 g/mole and at least 30% of the non-linear blocks are crosslinked with each other.

The organosiloxane block copolymer of this disclosure includes: (A) 40 to 90 mole percent disiloxy units of the formula [$R^1_2SiO_{2/2}$] arranged in linear blocks each having an average of from 10 to 400 disiloxy units [$R^1_2SiO_{2/2}$] per linear block;
(B) 10 to 60 mole percent trisiloxy units of the formula [$R^2SiO_{3/2}$] arranged in non-linear blocks each having a molecular weight of at least 500 g/mol; and
(C) 0.5 to 25 mole percent silanol groups [≡SiOH].

In some embodiments, at least 30% of the non-linear blocks in the organosiloxane block copolymers described herein are crosslinked with each other, e.g., at least 40% of the non-linear blocks are crosslinked with each other; at least 50% of the non-linear blocks are crosslinked with each other; at least 60% of the non-linear blocks are crosslinked with each other; at least 70% of the non-linear blocks are crosslinked with each other; or at least 80% of the non-linear blocks are crosslinked with each other. In other embodiments, from about 30% to about 80% of the non-linear blocks are crosslinked with each other; from about 30% to about 70% of the non-linear blocks are crosslinked with each other; from about 30% to about 60% of the non-linear blocks are crosslinked with each other; from about 30% to about 50% of the non-linear blocks are crosslinked with each other; from about 30% to about 40% of the non-linear blocks are crosslinked with each other; from about 40% to about 80% of the non-linear blocks are crosslinked with each other; from about 40% to about 70% of the non-linear blocks are crosslinked with each other; from about 40% to about 60% of the non-linear blocks are crosslinked with each other; from about 40% to about 50% of the non-linear blocks are crosslinked with each other; from about 50% to about 80% of the non-linear blocks are crosslinked with each other; from about 50% to about 70% of the non-linear blocks are crosslinked with each other; from about 55% to about 70% of the non-linear blocks are crosslinked with each other; from about 50% to about 60% of the non-linear blocks are crosslinked with each other; from about 60% to about 80% of the non-linear blocks are crosslinked with each other; or from about 60% to about 70% of the non-linear blocks are crosslinked with each other.

The aforementioned formulas may be alternatively described as [$R^1_2SiO_{2/2}$]$_a$[$R^2SiO_{3/2}$]$_b$, where the subscripts a and b represent the mole fractions of the siloxy units in the organosiloxane block copolymer. In these formulas, a may vary from 0.4 to 0.9, alternatively from 0.5 to 0.9, and alternatively from 0.6 to 0.9. Also in these formulas, b can vary from 0.1 to 0.6, alternatively from 0.1 to 0.5 and alternatively from 0.1 to 0.4.

Each $R^1$ in the above disiloxy unit formula, at each occurrence, is independently a $C_1$ to $C_{30}$ hydrocarbyl. The hydrocarbon group may independently be an alkyl, aryl, or alkylaryl group. As used herein, hydrocarbyl also includes halogen substituted hydrocarbyls, where the halogen may be chlorine, fluorine, bromine or combinations thereof. Each $R^1$ may be, at each occurrence, independently a $C_1$ to $C_{30}$ alkyl group, alternatively each $R^1$ may be, at each occurrence, independently a $C_1$ to $C_{18}$ alkyl group. Alternatively each $R^1$ may be, at each occurrence, independently a $C_1$ to $C_6$ alkyl group such as methyl, ethyl, propyl, butyl, pentyl, or hexyl. Alternatively each $R^1$ may be, at each occurrence, independently methyl. Each $R^1$ may be, at each occurrence, independently an aryl group, such as phenyl, naphthyl, or an anthryl group. Alternatively, each $R^1$ may be, at each occurrence, independently any combination of the aforementioned alkyl or aryl groups. Alternatively, each $R^1$ is, at each occurrence, independently phenyl, methyl, or a combination of both (e.g., one $R^1$ may be methyl and the other $R^1$ may be a phenyl).

Each $R^2$ in the above trisiloxy unit formula is, at each occurrence, independently a $C_1$ to $C_{20}$ hydrocarbyl. As used herein, hydrocarbyl also includes halogen substituted hydrocarbyls, where the halogen may be chlorine, fluorine, bromine or combinations thereof. Each $R^2$ may be, at each occurrence, independently an aryl group, such as phenyl, naphthyl, anthryl group. Alternatively, each $R^2$ may be, at each occurrence, independently an alkyl group, such as methyl, ethyl, propyl, or butyl. Alternatively, each $R^2$ may be, at each occurrence, independently any combination of the aforementioned alkyl or aryl groups. Alternatively, each $R^2$ is, at each occurrence, independently phenyl or methyl.

The organosiloxane block copolymer may include additional siloxy units, such as M siloxy units, Q siloxy units, other unique D or T siloxy units (e.g. having a organic groups other than $R^1$ or $R^2$), so long as the organosiloxane block copolymer includes the mole fractions of the disiloxy and trisiloxy units as described above. In other words, the sum of the mole fractions as designated by subscripts a and b, do not necessarily have to sum to one. The sum of a+b may be less than one to account for amounts of other siloxy units that may be present in the organosiloxane block copolymer. For example, the sum of a+b may be greater than 0.6, greater than 0.7, greater than 0.8, greater than 0.9, greater than 0.95, or greater than 0.98 or 0.99.

In one embodiment, the organosiloxane block copolymer consists essentially of the disiloxy units of the formula $[R^1{}_2SiO_{2/2}]$ and trisiloxy units of the formula $[R^2SiO_{3/2}]$, in the aforementioned weight percentages, while also including 0.5 to 25 mole percent silanol groups [≡SiOH], wherein $R^1$ and $R^2$ are as described herein. Thus, in this embodiment, the sum of a+b (when using mole fractions to represent the amount of disiloxy and trisiloxy units in the copolymer) is greater than 0.95, alternatively greater than 0.98. Moreover, in this embodiment, the terminology "consisting essentially of" describes that the organosiloxane block copolymer is free of other siloxane units not described herein.

In one embodiment, the organosiloxane block copolymer includes at least 30 weight percent of disiloxy units, alternatively at least 50 weight percent, alternatively at least 60 weight percent, or alternatively at least 70 weight percent of disiloxy units. The amount of disiloxy and trisiloxy units in the organosiloxane block copolymer may be described according to the weight percent of each in the organosiloxane block copolymer. In one embodiment, the disiloxy units have the formula $[(CH_3)_2SiO_{2/2}]$. In a further embodiment, the disiloxy units have the formula $[(CH_3)(C_6H_5)SiO_{2/2}]$.

In some embodiments, the organosiloxane block copolymers described herein comprise 40 to 90 mole percent disiloxy units of the formula $[R^1{}_2SiO_{2/2}]$, e.g., 50 to 90 mole percent disiloxy units of the formula $[R^1)SiO_{2/2}]$; 60 to 90 mole percent disiloxy units of the formula $[R^1{}_2SiO_{2/2}]$; 65 to 90 mole percent disiloxy units of the formula $[R^1{}_2SiO_{2/2}]$; 70 to 90 mole percent disiloxy units of the formula $[R^1{}_2SiO_{212}]$; or 80 to 90 mole percent disiloxy units of the formula $[R^1{}_2SiO_{2/2}]$; 40 to 80 mole percent disiloxy units of the formula $[R^1{}_2SiO_{2/2}]$; 40 to 70 mole percent disiloxy units of the formula $[R^1{}_2SiO_{2/2}]$; 40 to 60 mole percent disiloxy units of the formula $[R^1{}_2SiO_{2/2}]$; 40 to 50 mole percent disiloxy units of the formula $[R^1{}_2SiO_{2/2}]$; 50 to 80 mole percent disiloxy units of the formula $[R^1{}_2SiO_{2/2}]$; 50 to 70 mole percent disiloxy units of the formula $[R^1{}_2SiO_{2/2}]$; 50 to 60 mole percent disiloxy units of the formula $[R^1{}_2SiO_{2/2}]$; 60 to 80 mole percent disiloxy units of the formula $[R^1{}_2SiO_{2/2}]$; 60 to 70 mole percent disiloxy units of the formula $[R^1{}_2SiO_{2/2}]$; or 70 to 80 mole percent disiloxy units of the formula $[R^1{}_2SiO_{2/2}]$.

In some embodiments, the organosiloxane block copolymers described herein comprise 10 to 60 mole percent trisiloxy units of the formula $[R^2SiO_{3/2}]$, e.g., 10 to 20 mole percent trisiloxy units of the formula $[R^2SiO_{3/2}]$; 10 to 30 mole percent trisiloxy units of the formula $[R^2SiO_{3/2}]$; 10 to 35 mole percent trisiloxy units of the formula $[R^2SiO_{3/2}]$; 10 to 40 mole percent trisiloxy units of the formula $[R^2SiO_{3/2}]$; 10 to 50 mole percent trisiloxy units of the formula $[R^2SiO_{3/2}]$; 20 to 30 mole percent trisiloxy units of the formula $[R^2SiO_{3/2}]$; 20 to 35 mole percent trisiloxy units of the formula $[R^2SiO_{3/2}]$; 20 to 40 mole percent trisiloxy units of the formula $[R^2SiO_{3/2}]$; 20 to 50 mole percent trisiloxy units of the formula $[R^2SiO_{3/2}]$; 20 to 60 mole percent trisiloxy units of the formula $[R^2SiO_{3/2}]$; 30 to 40 mole percent trisiloxy units of the formula $[R^2SiO_{3/2}]$; 30 to 50 mole percent trisiloxy units of the formula $[R^2SiO_{3/2}]$; 30 to 60 mole percent trisiloxy units of the formula $[R^2SiO_{3/2}]$; 40 to 50 mole percent trisiloxy units of the formula $[R^2SiO_{3/2}]$; or 40 to 60 mole percent trisiloxy units of the formula $[R^2SiO_{3/2}]$.

The formula $[R^1{}_2SiO_{2/2}]_a[R^2SiO_{3/2}]_b$, and related formulae using mole fractions, as described herein, do not limit the structural ordering of the disiloxy $[R^1{}_2SiO_{2/2}]$ and trisiloxy $[R^2SiO_{3/2}]$ units in the organosiloxane block copolymer. Rather, these formulae provide a non-limiting notation to describe the relative amounts of the two units in the organosiloxane block copolymer, as per the mole fractions described above via the subscripts a and b. The mole fractions of the various siloxy units in the organosiloxane block copolymer, as well as the silanol content, may be determined by $^{29}Si$ NMR techniques.

Referring back to the silanol groups (≡SiOH), the amount of silanol groups present in the organosiloxane block copolymer, in some embodiments, varies from 0.5 to 35 mole percent silanol groups [≡SiOH], alternatively from 2 to 32 mole percent silanol groups [≡SiOH], and alternatively from 8 to 22 mole percent silanol groups [≡SiOH]. The silanol groups may be present in any siloxy units within the organosiloxane block copolymer. The amounts described above represent the total amount of silanol groups in the organosiloxane block copolymer. In one embodiment, a molar majority of the silanol groups are bonded to trisiloxy units, i.e., the resin component of the block copolymer.

In some embodiments, the organosiloxane block copolymers described herein comprise 0.5 to 25 mole percent silanol groups [≡SiOH](e.g., 0.5 to 5 mole percent, 0.5 to 10 mole percent, 0.5 to 15 mole percent, 0.5 to 20 mole percent, 5 to 10 mole percent, 5 to 15 mole percent, 5 to 20 mole percent, 5 to 25 mole percent, 10 to 15 mole percent 10 to 20 mole percent, 10 to 25 mole percent, 15 to 20 mole percent, 15 to 25 mole percent, or 20 to 25 mole percent).

The silanol groups present on the resin component of the organosiloxane block copolymer may allow the organosiloxane block copolymer to further react or cure at elevated temperatures or to cross-link. The crosslinking of the non-linear blocks may be accomplished via a variety of chemical mechanisms and/or moieties. For example, crosslinking of non-linear blocks within the organosiloxane block copolymer may result from the condensation of residual silanol groups present in the non-linear blocks of the organosiloxane block copolymer.

Crosslinking of the non-linear blocks within the organosiloxane block copolymer may also occur between "free resin" components and the non-linear blocks. "Free resin" components may be present in the organosiloxane block copolymer as a result of using an excess amount of an organosiloxane resin during the preparation of the organosiloxane block copolymer. The free resin components may crosslink with the non-linear blocks by condensation of the residual silanol groups present in the non-blocks and in the free resin components. The free resin components may alternatively provide crosslinking by reacting with lower molecular weight compounds such as those utilized as crosslinkers, as described herein. The free resin, when present, may be present in an amount of from about 10% to about 20% by weight of the organosiloxane block copolymers of the embodiments described herein, e.g., from about 15% to about 20% by weight organosiloxane block copolymers of the embodiments described herein.

Alternatively, certain compounds can be added during preparation of the organosiloxane block copolymer to crosslink non-resin blocks. These crosslinking compounds may include an organosilane having the formula $R^5{}_qSiX_{4-q}$ which may be utilized during the formation of the organosiloxane block copolymer (see, for example, step II of the method as described herein). In the aforementioned formula, $R^5$ is, in some embodiments, a $C_1$ to $C_8$ hydrocarbyl or a $C_1$ to $C_8$ halogen-substituted hydrocarbyl, X is, in some embodiments, a hydrolyzable group, and q is 0, 1, or 2. $R^5$ may alternatively be a $C_1$ to $C_8$ halogen-substituted hydrocarbyl, a $C_1$ to $C_8$ alkyl group, a phenyl group, or a methyl group, an ethyl group, or a combination of methyl and ethyl groups. X may be any hydrolyzable group, an oximo, acetoxy, halogen atom, hydroxyl (OH), or an alkoxy group. In one embodiment, the organosilane is an alkyltriacetoxysilane, such as methyltriacetoxysilane, ethyltriacetoxysilane, or a combination of both. Commercially available representative alkyltriacetoxysilanes include ETS-900 (Dow Corning Corp., Midland, Mich.). Other suitable, non-limiting organosilanes useful as crosslinkers include methyl-tris(methylethylketoxime)silane (MTO), methyl triacetoxysilane, ethyl triacetoxysilane, tetraacetoxysilane, tetraoximesilane, dimethyl diacetoxysilane, dimethyl dioximesilane, methyl tris(methylmethylketoxime)silane. In some embodiments, crosslinks within the organosiloxane block copolymer is siloxane bonds ≡Si—O—Si≡, resulting from the condensation of silanol groups.

The amount of crosslinking in the organosiloxane block copolymer may be estimated by determining an average molecular weight of the organosiloxane block copolymer, such as with GPC techniques. In some embodiments, crosslinking the organosiloxane block copolymer increases average molecular weight. Thus, an estimation of the extent of crosslinking may be made, given the average molecular weight of the organosiloxane block copolymer, the selection of the linear siloxy component (i.e., chain length as indicated by degree of polymerization), and the molecular weight of the non-linear block (which may be primarily controlled by the selection of the organosiloxane resin used to prepare the organosiloxane block copolymer).

The organosiloxane block copolymer may be isolated in a solid form, for example by casting films of a solution of the organosiloxane block copolymer in an organic solvent and allowing the solvent to evaporate. This solid form may be described as the light guide. In various embodiments, the solid form, isolated from the organosiloxane block copolymer solution, can have a range of thicknesses, e.g. from about 20 microns to about 2 mm; about 30 microns to about 1 mm; or about 40 microns to about 800 microns. The film can be prepared from any method that removes the solvent and generates a solid form, e.g. a film. For example, the film can be formed by using slot die coating, gravure coating, roll-to-roll processing techniques, etc. Alternatively, solid forms of the organosiloxane block copolymer can be formed by heating the solid copolymer above the glass transition of the resin component and processing in a melt. For example, passing the solid organosiloxane block copolymer through an extruder or three-roll mill may result in a molten mass that can subsequently be transferred to a cooled surface such as a cooled stainless steel roll, a fluid like cooled water or a gas like a nitrogen purge. Through both the solution casting methods such as slot die coating or the melt extrusion method, the solid organosiloxane block copolymer can be applied to a release liner such as siliconized PET or a fluorinated liner. These liners are typically smooth but can also be textured e.g. in or as an anti-reflective surface. Also, subsequent processing steps including vacuum lamination could benefit from the application of a roughened surface. In this way, vacuum can be more easily evacuated. Also, roughened films can be placed and moved on LED devices/light sources.

Upon drying or forming a solid, the non-linear blocks of the organosiloxane block copolymer, in some embodiments, aggregate together to form "nano-domains". As used herein, "predominately aggregated" describes that a majority (e.g., greater than 50%; greater than 60%; greater than 75%, greater than 80%, greater than 90%; from about 75% to about 90%, from about 80% to about 90%, or from about 75% to about 85%) of non-linear blocks of the organosiloxane block copolymer is, in some embodiments, found in certain regions of the solid composition, described herein as the "nano-domains". As used herein, "nano-domains" describes phase regions within the solid composition that are phase separated and possess at least one dimension, e.g. length, width, depth, or height, sized from 1 to 100 nanometers. The nano-domains may vary in shape, providing at least one dimension of the nano-domain is sized from 1 to 100 nanometers. Thus, the nano-domains may be regular or irregularly shaped. The nano-domains may be spherically shaped, tubular shaped, and in some instances lamellar shaped.

The organosiloxane block copolymer (e.g. the solid composition) may include a first phase and an incompatible second phase, the first phase including predominately the disiloxy units $[R^1{}_2SiO_{2/2}]$ and the second phase including predominately the trisiloxy units $[R^2SiO_{3/2}]$, wherein the non-linear blocks are aggregated into nano-domains which are incompatible with the first phase.

The structural ordering of the disiloxy and trisiloxy units, and characterization of the nano-domains, may be determined using analytical techniques such as Transmission Electron Microscopic (TEM) techniques, Atomic Force Microscopy (AFM), Small Angle Neutron Scattering, Small Angle X-Ray Scattering, and Scanning Electron Microscopy.

Alternatively, the structural ordering of the disiloxy and trisiloxy units in the organosiloxane block copolymer, and formation of nano-domains, may be inferred by determining certain physical properties of the solid composition, e.g. when the organosiloxane block copolymer is used as a coating. In one embodiment, a coating formed from the organosiloxane block copolymer and/or solid composition has an optical transmittance of visible light greater than 95%. Such optical clarity is possible when visible light is able to pass through a medium and not be diffracted by particles (or domains as used herein) having a size greater than 150 nanometers. As the particle size (domains) decreases, optical clarity may increase.

The organosiloxane block copolymer may include phase separated "soft" and "hard" segments resulting from blocks of linear D units and aggregates of blocks of non-linear T units, respectively. These respective soft and hard segments may be determined or inferred by differing glass transition temperatures ($T_g$). Thus a linear segment may be described as a "soft" segment. In various embodiments, the soft segment has a low $T_g$, for example less than 25° C., alternatively less than 0° C., or alternatively even less than −20° C. The linear segments may maintain "fluid" like behavior in a variety of conditions. Conversely, non-linear blocks may be described as "hard segments." In various embodiments, the hard segment has higher $T_g$, values, for example greater than 30° C., alternatively greater than 40° C., or alternatively even greater than 50° C.

In various embodiments, the organosiloxane block copolymer can be processed several times because the processing temperature ($T_{processing}$) is less than the temperature required to finally cure ($T_{cure}$) the organosiloxane block copolymer, i.e., $T_{processing} < T_{cure}$. However the organosiloxane block copolymer will cure and achieve high temperature stability when $T_{processing}$ is taken above $T_{cure}$. Thus, the present resin-linear organopolysiloxanes block copolymers offer a significant advantage of being "re-processable" in conjunction with the benefits that may be associated with silicones, such as; hydrophobicity, high temperature stability, moisture/UV resistance.

In one embodiment, the organosiloxane block copolymer is "curable". In this embodiment, the organosiloxane block copolymer may undergo further physical property changes through curing the organosiloxane block copolymer. As described above, the organosiloxane block copolymer includes a certain amount of silanol groups. The presence of these silanol groups may allow for further reactivity, e.g., a cure mechanism. Upon curing, the physical properties of organosiloxane block copolymer may be further altered.

The structural ordering of the disiloxy and trisiloxy units in the organosiloxane block copolymer as described above may provide the organosiloxane block copolymer with certain unique physical property characteristics when the organosiloxane block copolymer is formed. For example, the structural ordering of the disiloxy and trisiloxy units in the organosiloxane block copolymer may allow for a high optical transmittance of visible light. The structural ordering may also allow the organosiloxane block copolymer to flow and cure upon heating, yet remain stable at room temperature. The siloxy units may also be processed using lamination techniques. These properties may be useful to provide coatings for various electronic articles to improve weather resistance and durability, while providing low cost and easy procedures that are energy efficient.

In some embodiments, the light guide has different refractive indices in different regions through potential mechanisms disclosed herein. The resultant refractive index gradient may, in various examples, be gradual or may include abrupt changes. The resultant refractive indices may result from the use of different compositions in each region of the light guide (e.g., an organosiloxane block copolymer composition comprising [$Me_2SiO_{2/2}$] linear portions and [$PhSiO_{3/2}$] resin portions in one region and a different organosiloxane block copolymer composition comprising [$PhMeSiO_{2/2}$] linear portions and [$PhSiO_{3/2}$] resin portions in a different region); may result from different concentrations of the same composition in each region; may result from a gradient in concentration or molar amounts of certain components of the composition within each region or in going from one region to the next (e.g., a gradient in the mole percent disiloxy units of the formula [$R^1_2SiO_{2/2}$] and/or trisiloxy units of the formula [$R^2SiO_{3/2}$] and/or silanol groups, such that there is a gradient of disiloxy units and trisiloxy units; a gradient of disiloxy units, trisiloxy units, and silanol groups; a gradient of trisiloxy units and silanol groups; or a gradient of disiloxy units and silanol groups); may result from the presence/absence of an additive or byproduct from the synthesis of the composition (e.g., PhMe-cyclic byproducts resulting from the synthesis of the linear components that are incorporated into the resin-linear organosiloxane block copolymers described herein) in one region and the presence/absence of a different additive or byproduct from the synthesis of the composition in a different region; may result from differences in the size or type of certain features present in the composition in each region (e.g., a first region may contain lamellar features of a given size or size distribution, while a second region may contain spherical features of a given size or size distribution); or any combination of the aforementioned differences between the composition in one region relative to the composition in a second region. In some embodiments, the term "region" or "regions" as used herein, may broadly refer to the "nano-domains" formed by the aggregation of non-linear blocks of a organosiloxane block copolymer. The morphology of the nano-domains may be regular or irregular in shape. For example, the morphology of the nano-domains may be spherically shaped, cylindrically shaped, tubular shaped, and in some instances lamellar shaped, as suggested herein.

Method of Forming the Organosiloxane Block Copolymer:

The organosiloxane block copolymer may be formed using a method that includes the step of I) reacting a) a linear organosiloxane and b) an organosiloxane resin comprising at least 60 mole % of [$R^2SiO_{3/2}$] siloxy units in its formula, in c) a solvent. In one embodiment, the linear organosiloxane has the formula $R^1_q(E)_{(3-q)}SiO(R^1_2SiO_{2/2})_nSi(E)_{(3-q)}R^1_q$, wherein each $R^1$ is independently a $C_1$ to $C_{30}$ hydrocarbyl, n is 10 to 400, q is 0, 1, or 2, E is a hydrolyzable group including at least one carbon atom (e.g., from one to ten carbon atoms; from one to five carbon atoms; from one to four carbon atoms; or from one to three carbon atoms). In another embodiment, each $R^2$ is independently a $C_1$ to $C_{20}$ hydrocarbyl. In still another embodiment, the amounts of a) and b) used in step I are selected to provide the organosiloxane block copolymer with 40 to 90 mole % of disiloxy units [$R^1_2SiO_{2/2}$] and 10 to 60 mole % of trisiloxy units [$R^2SiO_{3/2}$]. In an even further embodiment, at least 95 weight percent of the linear organosiloxane added in step I is incorporated into the organosiloxane block copolymer.

In still another embodiment, the method includes step of II) reacting the organosiloxane block copolymer from step I), e.g., to crosslink the trisiloxy units of the organosiloxane block copolymer and/or to increase the weight average molecular weight ($M_w$) of the organosiloxane block copolymer by at least 50%. A further embodiment includes the step of further processing the organosiloxane block copolymer to enhance storage stability and/or optical clarity and/or the optional step of removing the organic solvent.

Figure 23A:
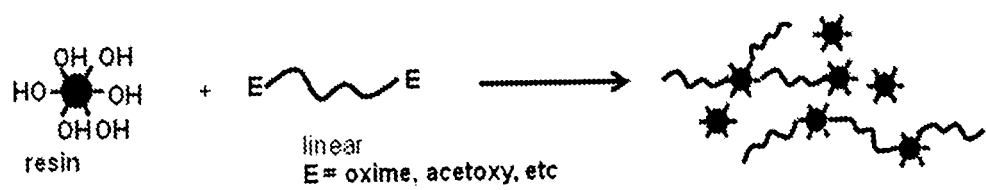
FIGS. 23A and 23B are schematics of Steps I and II of the method of forming the organosiloxane block copolymer disclosed herein.

The reaction of the first step may be represented generally according to the schematic shown in FIG. 23A wherein various OH groups (i.e., SiOH groups) on the organosiloxane resin may be reacted with the hydrolyzable groups (E) on the linear organosiloxane, to form the organosiloxane block copolymer and an H-(E) compound. The reaction in step I may be described as a condensation reaction between the organosiloxane resin and the linear organosiloxane.

The (a) Linear Organosiloxane:

Component a) in step I of the present process is a linear organosiloxane having the formula $R^1_q(E)_{(3-q)}SiO(R^1_2SiO_{2/2})_nSi(E)_{(3-q)}R^1_q$ where each $R^1$ is independently a $C_1$ to $C_{30}$ hydrocarbyl, the subscript "n" may be considered as the degree of polymerization (dp) of the linear organosiloxane and may vary from 10 to 400, the subscript "q" may be 0, 1, or 2, and E is a hydrolyzable group containing at least one carbon atom. While component a) is described as a linear organosiloxane having the formula $R^1{}_q(E)_{(3-q)}SiO(R^1{}_2SiO_{2/2})_nSi(E)_{(3-q)}R^1{}_q$, one skilled in the art recognizes small amount of alternative siloxy units, such a T ($R^1SiO_{3/2}$) siloxy units, may be incorporated into the linear organosiloxane and still be used as component a). As such, the organosiloxane may be considered as being "predominately" linear by having a majority of D ($R^1{}_2SiO_{2/2}$) siloxy units. Furthermore, the linear organosiloxane used as component a) may be a combination of several linear organosiloxanes. Still further, the linear organosiloxane used as component a) may comprise silanol groups. In some embodiments, the linear organosiloxane used as component a) comprises from about 0.5 to about 5 mole % silanol groups, e.g., from about 1 mole % to about 3 mole %; from about 1 mole % to about 2 mole % or from about 1 mole % to about 1.5 mole % silanol groups.

Each $R^1$ in the above linear organosiloxane formula, at each occurrence, is independently a $C_1$ to $C_{30}$ hydrocarbyl. The hydrocarbon group may independently be an alkyl, aryl, or alkylaryl group. As used herein, hydrocarbyl also includes halogen substituted hydrocarbyls, where the halogen may be chlorine, fluorine, bromine or combinations thereof. Each $R^1$ may be, at each occurrence, independently a $C_1$ to $C_{30}$ alkyl group, alternatively each $R^1$ may be, at each occurrence, independently a $C_1$ to $C_{18}$ alkyl group. Alternatively each $R^1$ may be, at each occurrence, independently a $C_1$ to $C_6$ alkyl group such as methyl, ethyl, propyl, butyl, pentyl, or hexyl. Alternatively each $R^1$ may be, at each occurrence, independently methyl. Each $R^1$ may be, at each occurrence, independently an aryl group, such as phenyl, naphthyl, or an anthryl group. Alternatively, each $R^1$ may be, at each occurrence, independently any combination of the aforementioned alkyl or aryl groups. Alternatively, each $R^1$ is, at each occurrence, independently phenyl, methyl, or a combination of both (e.g., one $R^1$ may be methyl and the other $R^1$ may be a phenyl).

E may be selected from any hydrolyzable group containing at least one carbon atom. In some embodiments, E is selected from an oximo, epoxy, carboxy, amino, amido group or combinations thereof. Alternatively, E may have the formula $R^1C(=O)O-$, $R^1{}_2C=N-O-$, or $R^4C=N-O-$, where $R^1$ is as defined above, and $R^4$ is hydrocarbyl. In one embodiment, E is $H_3CC(=O)O-$ (acetoxy) and q is 1. In one embodiment, E is $(CH_3)(CH_3CH_2)C=N-O-$ (methylethylketoxyimyl) and q is 1.

In one embodiment, the linear organosiloxane has the formula $(CH_3)_q(E)_{(3-q)}SiO[(CH_3)_2SiO_{2/2}]_nSi(E)_{(3-q)}(CH_3)_q$, where E, n, and q are as defined above.

In one embodiment, the linear organosiloxane has the formula $(CH_3)_q(E)_{(3-q)}SiO[(CH_3)(C_6H_5)SiO_{2/2}]_nSi(E)_{(3-q)}(CH_3)q$, where E, n, and q are as defined above.

Processes for preparing linear organosiloxanes suitable as component a) are known. In some embodiments, a silanol terminated polydiorganosiloxane is reacted with an "endblocking" compound such as an alkyltriacetoxysilane or a dialkylketoxime. The stoichiometry of the endblocking reaction may be adjusted such that a sufficient amount of the endblocking compound is added to react with all the silanol groups on the polydiorganosiloxane. In some embodiments, a mole of the endblocking compound is used per mole of silanol on the polydiorganosiloxane. Alternatively, a slight molar excess such as 1 to 10% of the endblocking compound may be used. The reaction may be conducted under anhydrous conditions to minimize condensation reactions of the silanol polydiorganosiloxane. In some embodiments, the silanol ended polydiorganosiloxane and the endblocking compound are dissolved in an organic solvent under anhydrous conditions, and allowed to react at room temperature, or at elevated temperatures (e.g., up to the boiling point of the solvent).

The (b) Organosiloxane Resin:

Component b) in the present process is an organosiloxane resin comprising at least 60 mole % of [$R^2SiO_{3/2}$] siloxy units in its formula, where each $R^2$ is, at each occurrence, independently a $C_1$ to $C_{20}$ hydrocarbyl. As used herein, hydrocarbyl also includes halogen substituted hydrocarbyls, where the halogen may be chlorine, fluorine, bromine or combinations thereof. Each $R^2$ may be, at each occurrence, independently an aryl group, such as phenyl, naphthyl, anthryl group. Alternatively, each $R^2$ may be, at each occurrence, independently an alkyl group, such as methyl, ethyl, propyl, or butyl. Alternatively, each $R^2$ may be, at each occurrence, independently any combination of the aforementioned alkyl or aryl groups. Alternatively, each $R^2$ is, at each occurrence, independently phenyl or methyl.

The organosiloxane resin may contain any amount and combination of other M, D, and Q siloxy units, provided the organosiloxane resin contains at least 70 mole % of [$R^2SiO_{3/2}$] siloxy units, alternatively the organosiloxane resin contains at least 80 mole % of [$R^2SiO_{3/2}$] siloxy units, alternatively the organosiloxane resin contains at least 90 mole % of [$R^2SiO_{3/2}$] siloxy units, or alternatively the organosiloxane resin contains at least 95 mole % of [$R^2SiO_{3/2}$] siloxy units. In some embodiments, the organosiloxane resin contains from about 70 to about 100 mole % of [$R^2SiO_{3/2}$] siloxy units, e.g., from about 70 to about 95 mole % of [$R^2SiO_{3/2}$] siloxy units, from about 80 to about 95 mole % of [$R^2SiO_{3/2}$] siloxy units or from about 90 to about 95 mole % of [$R^2SiO_{3/2}$] siloxy units. Organosiloxane resins useful as component b) include those known as "silsesquioxane" resins.

The weight average molecular weight ($M_w$) of the organosiloxane resin is not limiting, but, in some embodiments, ranges from 1000 to 10,000, or alternatively 1500 to 5000 g/mole.

One skilled in the art recognizes that organosiloxane resins containing such high amounts of [$R^2SiO_{3/2}$] siloxy units will inherently have a certain concentration of Si—OZ where Z may be hydrogen (i.e., silanol), an alkyl group (so that OZ is an alkoxy group), or alternatively OZ may also be any of the "E" hydrolyzable groups as described above. The Si—OZ content as a mole percentage of all siloxy groups present on the organosiloxane resin may be readily determined by $^{29}Si$ NMR. The concentration of the OZ groups present on the organosiloxane resin will vary, as dependent on the mode of preparation, and subsequent treatment of the resin. In some embodiments, the silanol (Si—OH) content of organosiloxane resins suitable for use in the present process will have a silanol content of at least 5 mole %, alternatively of at least 10 mole %, alternatively 25 mole %, alternatively 40 mole %, or alternatively 50 mole %. In other embodiments, the silanol content is from about 5 mole % to about 60 mole %, e.g., from about 10 mole % to about 60 mole %, from about 25 mole % to about 60 mole %, from about 40 mole % to about 60 mole %, from about 25 mole % to about 40 mole % or from about 25 mole % to about 50 mole %.

Organosiloxane resins containing at least 60 mole % of [$R^2SiO_{3/2}$] siloxy units, and methods for preparing them, are known in the art. They are, in some embodiments, prepared by hydrolyzing an organosilane having three hydrolyzable groups on the silicon atom, such as a halogen or alkoxy group in an organic solvent. A representative example for the preparation of a silsesquioxane resin may be found in U.S. Pat. No. 5,075,103. Furthermore, many organosiloxane resins are available commercially and sold either as a solid (flake or powder), or dissolved in an organic solvent. Suitable, non-limiting, commercially available organosiloxane resins useful as component b) include; Dow Corning® 217 Flake Resin, 233 Flake, 220 Flake, 249 Flake, 255 Flake, Z-6018 Flake (Dow Corning Corporation, Midland Mich.).

One skilled in the art further recognizes that organosiloxane resins containing such high amounts of $[R^2SiO_{3/2}]$ siloxy units and silanol contents may also retain water molecules, especially in high humidity conditions. Thus, it is often beneficial to remove excess water present on the resin by "drying" the organosiloxane resin prior to reacting in step I. This may be achieved by dissolving the organosiloxane resin in an organic solvent, heating to reflux, and removing water by separation techniques (for example Dean Stark trap or equivalent process).

The amounts of a) and b) used in the reaction of step I are selected to provide the resin-linear organosiloxane block copolymer with 40 to 90 mole % of disiloxy units $[R^1{}_2SiO_{2/2}]$ and 10 to 60 mole % of trisiloxy units $[R^2SiO_{3/2}]$. The mole % of disiloxy and trisiloxy units present in components a) and b) may be readily determined using $^{29}$Si NMR techniques. The starting mole % then determines the mass amounts of components a) and b) used in step I.

The amount of components a) and b) selected may also create a molar excess of the silanol groups on the organosiloxane resin vs. amount of linear organosiloxane added. Thus, a sufficient amount of the organosiloxane resin may be added to potentially react with all the linear organosiloxane added in step I). As such, a molar excess of the organosiloxane resin is used. The amounts used may be determined by accounting for the moles of the organosiloxane resin used per mole of the linear organosiloxane.

As discussed above, the reaction effected in step I is a condensation reaction between the hydrolyzable groups of linear organosiloxane with the silanol groups on the organosiloxane resin. A sufficient amount of silanol groups needs to remain on the resin component of the formed resin-linear organosiloxane block copolymer to further react in step II of the process described herein. In some embodiments, at least 10 mole %, alternatively at least 20 mole %, or alternatively at least 30 mole % silanol may remain on the trisiloxy units of the resin-linear organosiloxane block copolymer as produced in step I of the process described herein. In some embodiments, from about 10 mole % to about 60 mole %, e.g., from about 20 mole % to about 60 mole %, or from about 30 mole % to about 60 mole %, may remain on the trisiloxy units of the resin-linear organosiloxane block copolymer as produced in step I of the process described herein.

The reaction conditions for reacting the aforementioned (a) linear organosiloxane with the (b) organosiloxane resin are not limited. In some embodiments, reaction conditions are selected to effect a condensation type reaction between the a) linear organosiloxane and b) organosiloxane resin. Various non-limiting embodiments and reaction conditions are described in the Examples herein. In some embodiments, the (a) linear organosiloxane and the (b) organosiloxane resin are reacted at room temperature. In other embodiments, (a) and (b) are reacted at temperatures that exceed room temperature and that range up to about 50, 75, 100, or even up to 150° C. Alternatively, (a) and (b) can be reacted together at reflux of the solvent. In still other embodiments, (a) and (b) are reacted at temperatures that are below room temperature by 5, 10, or even more than 10° C. In still other embodiments (a) and (b) react for times of 1, 5, 10, 30, 60, 120, or 180 minutes, or even longer. In some embodiments, (a) and (h) are reacted under an inert atmosphere, such as nitrogen or a noble gas. Alternatively, (a) and (b) may be reacted under an atmosphere that includes some water vapor and/or oxygen. Moreover, (a) and (b) may be reacted in any size vessel and using any equipment including mixers, vortexers, stirrers, heaters, etc. In other embodiments, (a) and (b) are reacted in one or more organic solvents which may be polar or non-polar. Representative aromatic solvents include toluene, xylene, benzene, and the like. The amount of the organosiloxane resin dissolved in the organic solvent may vary, but the amount may be selected to minimize the chain extension of the linear organosiloxane or pre-mature condensation of the organosiloxane resin.

The order of addition of components a) and b) may vary. In some embodiments, the linear organosiloxane is added to a solution of the organosiloxane resin dissolved in the organic solvent. This order of addition is believed to enhance the condensation of the hydrolyzable groups on the linear organosiloxane with the silanol groups on organosiloxane resin, while minimizing chain extension of the linear organosiloxane or pre-mature condensation of the organosiloxane resin. In other embodiments, the organosiloxane resin is added to a solution of the linear organosiloxane dissolved in the organic solvent.

The progress of the reaction in step I, and the formation of the resin-linear organosiloxane block copolymer, may be monitored by various analytical techniques, such as GPC, IR, or $^{29}$Si NMR. In some embodiments, the reaction in step I is allowed to continue until at least 95 weight percent (e.g., at least 96%, at least 97%, at least 98%, at least 99% or 100%) of the linear organosiloxane added in step I is incorporated into the resin-linear organosiloxane block copolymer.

Step II) of the process for preparing organosiloxane block copolymers involves further reacting the resin-linear organosiloxane block copolymer from step I) to crosslink the trisiloxy units of the resin-linear organosiloxane block copolymer to increase the molecular weight of the resin-linear organosiloxane block copolymer by at least 50%, alternatively by at least 60%, alternatively by 70%, alternatively by at least 80%, alternatively by at least 90%, or alternatively by at least 100%. In some embodiments, the step II) involves further reacting the resin-linear organosiloxane block copolymer from step I) to crosslink the trisiloxy units of the resin-linear organosiloxane block copolymer to increase the molecular weight of the resin-linear organosiloxane block copolymer from about 50% to about 100%, e.g., from about 60% to about 100%, from about 70% to about 100%, from about 80% to about 100% or from about 90% to about 100%.

Figure 23B:
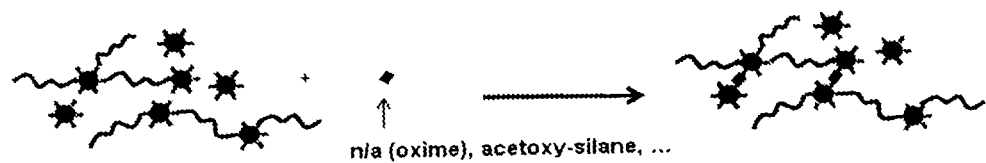

The reaction of the second step of the method may be represented generally according to the schematic shown in FIG. 23B.

It is believed that reaction of step II crosslinks the trisiloxy blocks of the resin-linear organosiloxane block copolymer formed in step I, which will increase the average molecular weight of the block copolymer. The inventors also believe the crosslinking of the trisiloxy blocks provides the block copolymer with an aggregated concentration of trisiloxy blocks, which ultimately may help to form "nano-domains" in solid compositions of the block copolymer. In other words, this aggregated concentration of trisiloxy blocks may phase separate when the block copolymer is isolated in a solid form such as a film or cured coating. The aggregated concentration of trisiloxy block within the block copolymer and subsequent formation of "nano-domains" in the solid compositions containing the block copolymer, may provide for enhanced optical clarity of these compositions as well as the other physical property benefits associated with these materials.

The crosslinking reaction in Step II may be accomplished via a variety of chemical mechanisms and/or moieties. For example, crosslinking of non-linear blocks within the block copolymer may result from the condensation of residual silanol groups present in the non-linear blocks of the copolymer. Crosslinking of the non-linear blocks within the block copolymer may also occur between "free resin" components and the non-linear blocks. "Free resin" components may be present in the block copolymer compositions as a result of using an excess amount of an organosiloxane resin in step I of the preparation of the block copolymer. The free resin component may crosslink with the non-linear blocks by condensation of the residual silanol groups present on the non-linear blocks and on the free resin. The free resin may provide crosslinking by reacting with lower molecular weight compounds added as crosslinkers, as described herein.

Step II may occur simultaneous upon formation of the resin-linear organosiloxane of step I, or involve a separate reaction in which conditions have been modified to effect the step II reaction. The step II reaction may occur in the same conditions as step I. In this situation, the step II reaction proceeds as the resin-linear organosiloxane block copolymer is formed. Alternatively, the reaction conditions used for step I) are extended to further the step II reaction. Alternatively, the reaction conditions may be changed, or additional ingredients added to effect the step II reaction.

In some embodiments, the step II reaction conditions may depend on the selection of the hydrolyzable group (E) used in the starting linear organosiloxane. When (E) in the linear organosiloxane is an oxime group, it is possible for the step II reaction to occur under the same reaction conditions as step I. That is, as the linear-resin organosiloxane block copolymer is formed in step I, it will continue to react via condensation of the silanol groups present on the resin component to further increase the molecular weight of the resin-linear organosiloxane block copolymer. Not wishing to be bound by any theory, it is believed that when (E) is an oximo group, the hydrolyzed oximo group (for example methyl ethylketoxime) resulting from the reaction in step I may act as a condensation catalyst for the step II reaction. As such, the step II reaction may proceed simultaneously under the same conditions for step I. In other words, as the resin-linear organosiloxane block copolymer is formed in step I, it may further react under the same reaction conditions to further increase its molecular weight via a condensation reaction of the silanol groups present on the resin component of the copolymer. However, when (E) on the linear organosiloxane is an acetoxy group, the resulting hydrolyzed group (acetic acid), does not sufficiently catalyze the step II) reaction. Thus, in this situation the step II reaction may be enhanced with a further component to effect condensation of the resin components of the resin-linear organosiloxane block copolymer.

In one embodiment, an organosilane having the formula $R^5_q SiX_{4-q}$ is added during step II), where $R^5$ is a $C_1$ to $C_8$ hydrocarbyl or a $C_1$ to $C_8$ halogen-substituted hydrocarbyl, X is a hydrolyzable group, and q is 0, 1, or 2. $R^5$ is a $C_1$ to $C_8$ hydrocarbyl or a $C_1$ to $C_8$ halogen-substituted hydrocarbyl, or alternatively $R^5$ is a $C_1$ to $C_8$ alkyl group, or alternatively a phenyl group, or alternatively $R^5$ is methyl, ethyl, or a combination of methyl and ethyl. X is any hydrolyzable group, alternatively X may be E, as defined above, a halogen atom, hydroxyl (OH), or an alkoxy group. In one embodiment, the organosilane is an alkyltriacetoxysilane, such as methyltriacetoxysilane, ethyltriacetoxysilane, or a combination of both. Commercially available representative alkyltriacetoxysilanes include ETS-900 (Dow Corning Corp., Midland, Mich.). Other suitable, non-limiting organosilanes useful in this embodiment include; methyl-tris(methylethylketoxime) silane (MTO), methyl triacetoxysilane, ethyl triacetoxysilane, tetraacetoxysilane, tetraoximesilane, dimethyl diacetoxysilane, dimethyl dioximesilane, methyl tris (methylmethylketoxime)silane.

The amount of organosilane having the formula $R^5_q SiX_{4-q}$ when added during step II) may vary, but may be based on the amount of organosiloxane resin used in the process. The amount of silane used may provide a molar stoichiometry of 2 to 15 mole % of organosilane per moles of Si on the organosiloxane resin. Furthermore, the amount of the organosilane having the formula $R^5_q SiX_{4-q}$ added during step II) is controlled to ensure a stoichiometry that does not consume all the silanol groups on the organosiloxane block copolymer. In one embodiment, the amount of the organosilane added in step II is selected to provide an organosiloxane block copolymer containing 0.5 to 35 mole percent of silanol groups [≡SiOH].

Step III in the present method is optional, and includes further processing the organosiloxane block copolymer formed using the aforementioned method steps to enhance storage stability and/or optical clarity. As used herein the phrase "further processing" describes any further reaction or treatment of the organosiloxane block copolymer to enhance storage stability and/or optical clarity. The organosiloxane block copolymer as produced in step II may include an amount of reactive "OZ" groups (e.g. groups, where Z is as described above), and/or X groups (where X is introduced into the organosiloxane block copolymer when the organosilane having the formula $R^5_q SiX_{4-q}$ is used in step II). The OZ groups present on the organosiloxane block copolymer at this stage may be silanol groups that were originally present on the resin component, or alternatively may result from the reaction of the organosilane having the formula $R^5_q SiX_{4-q}$ with silanol groups, when the organosilane is used in step II. Alternatively, further reaction of residual silanol groups may further enhance the formation of the resin domains and improve the optical clarity of the organosiloxane block copolymer. Thus, optional step III may be performed to further react OZ or X present on the organosiloxane block copolymer produced in Step II to improve storage stability and/or optical clarity. The conditions for step III may vary, depending on the selection of the linear and resin components, their amounts, and the endcapping compounds used.

In one embodiment of the method, step III is performed by reacting the organosiloxane block copolymer from step II with water and removing any small molecular compounds formed in the method such as acetic acid. In this embodiment, the organosiloxane block copolymer is, in some embodiments, produced from a linear organosiloxane where E is an acetoxy group, and/or an acetoxy silane is used in step II. Although not wishing to be hound by any theory, the organosiloxane block copolymer formed in step II may include a quantity of hydrolyzable Si—O—C(O)CH$_3$ groups, which may limit the storage stability of the organosiloxane block copolymer. Thus, water may be added to the organosiloxane block copolymer formed from step II, which may hydrolyze Si—O—C(O)CH$_3$ groups to further link the trisiloxy units, and eliminate acetic acid. The formed acetic acid, and any excess water, may be removed by known separation techniques. The amount of water added in this embodiment may vary, but, in some embodiments, is 10 weight %, or alternatively 5 weight % is added per total solids (as based on organosiloxane block copolymer in the reaction medium).

In another embodiment of the method, step III is performed by reacting the organosiloxane block copolymer from step II with an endcapping compound chosen from an alcohol, oxime, or trialkylsiloxy compound. In this embodiment, the organosiloxane block copolymer is produced from a linear organosiloxane where E is an oxime group. The endcapping compound may be a $C_1$-$C_{20}$ alcohol such as methanol, ethanol, propanol, butanol, or others in the series, Alternatively, the alcohol is n-butanol. The endcapping compound may also be a trialkylsiloxy compound, such as trimethylmethoxysilane or trimethylethoxysilane. The amount of endcapping compound may vary and may be between 3 and 15 wt % with respect to the organosiloxane block copolymer.

In some embodiments, step III includes adding to the resin-linear organosiloxane block copolymer from step II) a superbase catalyst or a stabilizer. The superbase catalyst and stabilizer amounts used in step III are the same as described above.

Step IV is optional, and involves removing the organic solvent used in the reactions of steps I and II. The organic solvent may be removed by any known techniques, but, in some embodiments, involves heating the resin-linear organosiloxane block copolymer compositions at elevated temperature, either at atmospheric conditions or under reduced pressures. In some embodiments, not all of the solvent is removed. In this embodiment, at least 20%, at least 30%, at least 40%, or at least 50% of the solvent is removed, e.g., at least 60%, at least 70%, at least 75%, at least 80% or at least 90% of the solvent is removed. In some embodiments, less than 20% of the solvent is removed, e.g., less than 15%, less than 10%, less than 5% or 0% of the solvent is removed. In other embodiments, from about 20% to about 100% of the solvent is removed, e.g., from about 30% to about 90%, from about 20% to about 80%, from about 30 to about 60%, from about 50 to about 60%, from about 70 to about 80% or from about 50% to about 90% of the solvent is removed.

In additional non-limiting embodiments, this disclosure includes one or more elements, components, method steps, test methods, etc., as described in one or more of Published PCT Appl. Nos. WO2012/040302; WO2012/040305; WO2012/040367; WO2012/040453; and WO2012/040457, all of which are expressly incorporated herein by reference.

Method of Forming the Light Guide:

This disclosure also provides a method of forming the light guide (52). The light guide (52) may be formed simply by forming the organosiloxane block copolymer. In various embodiments, the organosiloxane block copolymer is further processed to form a sheet, shape, etc. as described above, thereby forming the light guide (52). The organosiloxane block copolymer may be processed using any method known in the art, any step described above, etc. to form the light guide (52). For example, the organosiloxane block copolymer may be formed into a sheet and the sheet may then be cut into ribbons/strips which are then folded or otherwise manipulated to form the light guide (52).

Article:

This disclosure also provides an article (50) that includes the light source (54) and the light guide (52) disposed thereon. The terminology "disposed thereon" describes that the light guide (52) may be disposed on and in direct contact with the light source (54) or may be disposed on, but spaced apart from, the light source (54) yet still be disposed thereon.

The article (50) may be alternatively described as solid state lighting and can be used in any application including, but not limited to, instrument panels & switches, courtesy lighting, turn and stop signals, household appliances, VCR/DVD/stereo/audio/video devices, toys/games instrumentation, security equipment, switches, architectural lighting, signage (channel letters), machine vision, retail displays, emergency lighting, neon and bulb replacement, flashlights, accent lighting full color video, monochrome message boards, in traffic, rail, and aviation applications, in mobile phones, PDAs, digital cameras, lap tops, in medical instrumentation, bar code readers, color & money sensors, encoders, optical switches, fiber optic communication, and combinations thereof.

The article (50) may also include a substrate and/or a superstrate. The substrate may provide protection to a rear surface of the article (50) while a superstrate may provide protection to a front surface of the article (50). The substrate and the superstrate may be the same or may be different and each may independently include any suitable material known in the art. The substrate and/or superstrate may be soft and flexible or may be rigid and stiff. Alternatively, the substrate and/or superstrate may include rigid and stiff segments while simultaneously including soft and flexible segments. The substrate and/or superstrate may be transparent to light, may be opaque, or may not transmit light (i.e., may be impervious to light). In some embodiments, the superstrate transmits light. In one embodiment, the substrate and/or superstrate includes glass. In another embodiment, the substrate and/or superstrate includes metal foils, polyimides, ethylene-vinyl acetate copolymers, and/or organic fluoropolymers including, but not limited to, ethylene tetrafluoroethylene (ETFE), Tedlar®, polyester/Tedlar®, Tedlar®/polyester/Tedlar®, polyethylene terephthalate (PET) alone or coated with silicon and oxygenated materials (SiOx), and combinations thereof. In one embodiment, the substrate is further defined as a PET/SiOx-PET/Al substrate, wherein x has a value of from 1 to 4.

The substrate and/or superstrate may be load bearing or non-load bearing and may be included in any portion of the article (50). In some embodiments, the substrate is load bearing. The substrate may be a "bottom layer" of the article (50) that is, in some embodiments, positioned behind the light emitting diode and serves as mechanical support. Alternatively, the article (50) may include a second or additional substrate and/or superstrate. The substrate may be the bottom layer of the article (50) while a second substrate may be the top layer and function as the superstrate. In some embodiments, the second substrate (e.g. a second substrate functioning as a superstrate is transparent to the light (e.g. visible, UV, and/or infrared light) and is positioned on top of the substrate. The second substrate may be used to protect the article (50) from environmental conditions such as rain, show, and heat. In one embodiment, the second substrate functions as a superstrate and is a rigid glass panel that is transparent to light and is used to protect the front surface of the article (50).

In addition, the article (50) may also include one or more tie layers. The one or more tie layers may be disposed on the substrate to adhere the light emitting diode to the substrate. In one embodiment, the article (50) does not include a substrate and does not include a tie layer. The tie layer may be transparent to UV, infrared, and/or visible light. However, the tie layer may be impermeable to light or opaque. The tie layer may be tacky and may be a gel, gum, liquid, paste, resin, or solid. In one embodiment, the tie layer is a film.

Moreover, the article (50) may include a phosphor. The phosphor is not particularly limited and may include any known in the art. In one embodiment, the phosphor is made from a host material and an activator, such as copper-activated zinc sulfide and silver-activated zinc sulfide. Suitable but non-limiting host materials include oxides, nitrides and oxynitrides, sulfides, selenides, halides or silicates of zinc, cadmium, manganese, aluminum, silicon, or various rare earth metals. Additional suitable phosphors include, but are not limited to, $Zn_2SiO_4$:Mn (Willemite); ZnS:Ag+(Zn,Cd)S:Ag; ZnS:Ag+ZnS:Cu+$Y_2O_2$S:Eu; ZnO:Zn; KCl; ZnS:Ag,Cl or ZnS:Zn; (KF,$MgF_2$):Mn; (Zn,Cd)S:Ag or (Zn,Cd)S:Cu; $Y_2O_2$S:Eu+$Fe_2O3$, ZnS:Cu,Al; ZnS:Ag+Co-on-$Al_2O_3$; (KF, $MgF_2$):Mn; (Zn,Cd)S:Cu,Cl; ZnS:Cu or ZnS:Cu,Ag; $MgF_2$: Mn; (Zn,Mg)$F_2$:Mn; $Zn_2SiO_4$:Mn,As; ZnS:Ag+(Zn,Cd)S:

Cu; $Gd_2O_2S$:Tb; $Y_2O_2S$:Tb; $Y_3Al_5O_{12}$:Ce; $Y_2SiO_5$:Ce; $Y_3Al_5O_{12}$:Tb; ZnS:Ag,Al; ZnS:Ag; ZnS:Cu,Al or ZnS:Cu,Au,Al; (Zn,Cd)S:Cu,Cl+(Zn,Cd)S:Ag,Cl; $Y_2SiO_5$:Tb; $Y_2OS$:Tb; $Y_3(Al,Ga)_5O_{12}$:Ce; $Y_3$ $(Al,Ga)_5O_{12}$:Tb; $InBO_3$: Tb; $InBO_3$:Eu; $InBO_3$:Tb+$InBO_3$:Eu; $InBO_3$:Tb+$InBO_3$: Eu+ZnS:Ag; $(Ba,Eu)Mg_2Al_{16}O_{27}$; $(Ce,Tb)MgAl_{11}O_{19}$; $BaMgAl_{10}O_{17}$:Eu,Mn; $BaMg_2Al_{16}O_{97}$:Eu(II); $BaMgAl_{10}O_{17}$:Eu,Mn; $BaMg_2Al_{16}O_{27}$:Eu(II),Mn(II); $Ce_{0.67}Tb_{0.33}MgAl_{11}O_{19}$:Ce,Tb; $Zn_2SiO_4$:Mn,$Sb_2O_3$; $CaSiO_3$:Pb,Mn; $CaWO_4$ (Scheelite); $CaWO_4$:Pb; $MgWO_4$; $(Sr,Eu,Ba,Ca)_5(PO_4)_3Cl$; $Sr_5Cl(PO_4)_3$:Eu(II); $(Ca,Sr,Ba)_3$ $(PO_4)_2Cl_2$:Eu; $(Sr,Ca,Ba)_{10}(PO_4)_6Cl_2$:Eu; $Sr_2P_2O_7$:Sn(II); $Sr_6P_5BO_{20}$:Eu; $Ca_5F(PO_4)_3$:Sb; $(Ba,Ti)_2P_2O_7$:Ti; $3Sr_3$ $(PO_4)_2$·$SrF_2$:Sb,Mn; $Sr_5F(PO_4)_3$:Sb,Mn; $Sr_5F(PO_4)_3$:Sb,Mn; $LaPO_4$:Ce,Tb; $(La,Ce,Tb)PO_4$; $(La,Ce,Tb)PO_4$:Ce,Tb; $Ca_3$ $(PO_4)_2$·$CaF_2$:Ce,Mn; $(Ca,Zn,Mg)_3$ $(PO_4)_2$:Sn; $(Zn,Sr)_3$ $(PO_4)_2$:Mn; $(Sr,Mg)_3(PO_4)_2$:Sn; $(Sr,Mg)_3(PO_4)_2$:Sn(II); $Ca_5F(PO_4)_3$:Sb,Mn; $Ca_5(F,Cl)(PO_4)_3$:Sb,Mn; $(Y,Eu)_2O_3$; $Y_2O_3$:Eu(III); $Mg_4(F)GeO_6$:Mn; $Mg_4(F)(Ge,Sn)O_6$:Mn; $Y(P,V)O_4$:Eu; $YVO_4$:Eu; $Y_2O_2S$:Eu; 3.5 MgO.0.5 $MgF_2$·$GeO_2$:Mn; $Mg_5As_2O_{11}$:Mn; $SrAl_2O_7$:Pb; $LaMgAl_{11}O_{19}$:Ce; $LaPO_4$:Ce; $SrAl_{12}O_{19}$:Ce; $BaSi_2O_5$:Pb; $SrFB_2O_3$:Eu(II); $SrB_4O_7$:Eu; $Sr_7MgSi_2O_7$:Pb; $MgGa_2O_4$: Mn(II); $Gd_2O_2S$:Tb; $Gd_2O_2S$:Eu; $Gd_2O_2S$:Pr; $Gd_2O_2S$:Pr, Ce,F; $Y_2O_2S$:Tb; $Y_2O_2S$:Eu; $Y_2O_2S$:Pr; Zn(0.5)Cd(0.4)S: Ag; Zn(0.4)Cd(0.6)S:Ag; $CdWO_4$; $CaWO_4$; $MgWO_4$; $Y_2SiO_5$:Ce;$YAlO_3$:Ce; $Y_3Al_5O_{12}$:Ce; $Y_3(Al,Ga)_5O_{12}$:Ce; CdS:In; ZnO:Ga; ZnO:Zn; (Zn,Cd)S:Cu,Al; ZnS:Cu,Al,Au; ZnCdS:Ag,Cu; ZnS:Ag; anthracene, EJ-212, $Zn_2SiO_4$:Mn; ZnS:Cu; NaI:Tl; CsI:Tl; LiF/ZnS:Ag; LiF/ZnSCu,Al,Au, and combinations thereof.

The phosphor may be present in any portion of the article (50). The phosphor may be dispersed in the solid composition and/or may be present as a discrete layer in the article (50). In other words, the phosphor may be present in an independent layer from the solid composition or may be combined with the solid composition, e.g. in a gradient pattern, homogeneously dispersed throughout, or present in higher concentrations in some areas of the solid composition and in lower concentration in other areas of the solid composition. In another embodiment, the phosphor is present in a lens.

The article (50) may also include a release liner. The release liner may be any known in the art such as siliconized PET or a fluorinated liner. These release liners are, in some embodiments, smooth but can also be textured e.g. in or as an anti-reflective surface.

Method of Forming the Article:

This disclosure also provides a method of forming the article (50). The method includes the step of combining the light source (54) and the light guide (52) to form the article (50). The step of combining is not particularly limited and may be include, or be further defined as, disposing the light source (54) and the light guide (52) next to each other or on top of each other, and/or in direct or in indirect contact with each other. For example, the light guide (52) may be disposed on and in direct contact with the light source (54). Alternatively, the light guide (52) may be disposed on, but separated from and not in direct contact with, the light source (54) yet may still be disposed on the light source (54).

The light guide (52) may be heated to flow, melted, pressed, (vacuum) laminated, compression molded, injection transfer molded, calendared, hot-embossed, injection molded, extruded, or any other process step that changes the light guide (52) from a solid to a liquid or to a softened solid. The liquid or softened light guide (52) may then be applied to the light source (54) by any one or more of the aforementioned techniques, via spraying, pouring, painting, coating, dipping, brushing, or the like.

In one embodiment, the step of combining is further defined as melting the light guide (52) such that the light guide (52) is disposed on and in direct contact with the light source (54). In another embodiment, the step of combining is further defined as melting the light guide (52) such that the light guide (52) is disposed on and in indirect contact with the light source (54). In still another embodiment, the method further includes the step of providing a solution of the solid composition (e.g. the light guide (52)) in a solvent, e.g. dissolved or partially dissolved in the solvent. In an even further embodiment, the method includes the step of removing the solvent to form the solid composition and the light guide (52) prior to the step of combining the light guide (52) and the light source (54). In still another embodiment, the method further includes the step of forming the solid composition subsequent to the step of removing the solvent and prior to the step of combining the light guide (52) and the light source (54).

In other embodiments, the method includes the step of curing the solid composition, e.g. via a condensation reaction, a free radical reaction, or a hydrosilylation reaction. It is contemplated that any catalysts, additives, and the like may be utilized in the step of curing. For example, acidic or basic condensation catalysts may be utilized. Alternatively, hydrosilylation catalysts, such as platinum catalysts, may be utilized. In one embodiment, the step of curing occurs at a temperature higher than the melting temperature of the solid composition. Alternatively, the step of curing may occur at approximately the melting temperature, or below the melting temperature, of the layer.

EXAMPLES

Example 1

Reagents

| | | |
|---|---|---|
| Phenyl-T Resin (FW = 136.6 g/mol Si) | 1.581 mols Si | 216.0 g |
| OH-PhMe-OH (FW = 136.3 g/mol Si) 1.03 mol % OH | 1.937 mols Si 0.0200 mols SiOH | 264.0 g |
| 50/50 MTA/ETA Distilled Avg. FW = 231.2 g/mol Si | 0.187 mols Si | 43.16 g |
| Toluene | | 720.0 g |

Procedure:

A 2 L 3-neck round bottom flask was charged with toluene (544.0 g) and Phenyl-T Resin (216.0 g). The flask was equipped with a thermometer, Teflon stir paddle, and a Dean Stark apparatus attached to a water-cooled condenser. A nitrogen blanket was applied. The Dean Stark apparatus was prefilled with toluene. A heating mantle was used for heating. The solution was heated at reflux for 30 minutes and then cooled to 108° C. (pot temperature). A solution of toluene (176.0 g) and OH—PhMe—OH (264.0 g) was capped with 50/50 MTA/ETA (4.84 g, 0.0209 mols Si) in a glove box (same day) under nitrogen by adding the methyl triacetoxy silane (MTA)/ethyl triacetoxy silane (ETA) to the OH—PhMe—OH and mixing at room temperature for 2 hours. This solution was then added to the Phenyl-T Resin quickly at 108° C. and heated at reflux for 2 hours and then cooled to 108° C. An additional amount of 50/50 MTA/ETA (38.32 g, 0.166 mols Si) was then added, heated at reflux for 2 hrs, and then cooled to a pot temperature of 90° C. Deionized (DI) water (33.63 g) was then added, heated at reflux for 1 hour (no removal of water). Water was then removed via azeotropic distillation with heat. Reflux was then continued for 3 hours and the solution was then cooled to 100° C. Pre-dried Darco G60 carbon black (4.80 g) was then added and the solution was cooled to room temperature with stirring and then stirred overnight at room temperature. The solution was then pressure filtered through a 0.45 µm filter to yield an organosiloxane block copolymer having the formula $D^{PhMe}_{0.519}T^{Alkyl}_{0.050}T^{Ph}_{0.431}$, wherein OZ=22 mol %, as confirmed by $^{29}$Si NMR.

Example 2

Reagents

| | | |
|---|---|---|
| Phenyl-T Resin (FW = 137 g/mol Si) | 2.044 mols Si | 280.2 g |
| 184 DP silanol term. PDMS (FW = 74.3 g/mol Si) ~1.01 mol % OH | 9.690 mols Si 0.0979 mols SiOH | 720.0 g |
| 50/50 MTA/ETA Distilled Avg. FW = 231.2 g/mol Si | 0.201 mols Si | 46.34 g |
| Toluene | | 1500.0 g |
| DI water | | 325.7 g |

Procedure:

A 5 L 4-neck round bottom flask was charged with toluene (1000.0 g) and Phenyl-T Resin (280.2 g). The flask was equipped with a thermometer, Teflon stir paddle, and a Dean Stark apparatus attached to a water-cooled condenser. A nitrogen blanket was applied. An oil bath was used for heating. The Dean Stark apparatus was prefilled with toluene and the solution was heated at reflux for 30 minutes and then cooled to 108° C. (pot temperature). A solution of toluene (500.0 g) and silanol terminated PDMS (720.0 g) was then capped with 50/50 MTA/ETA in a glove box (same day) under nitrogen by adding 50/50 MTA/ETA (23.77 g, 0.1028 mols Si) to the silanol terminated PDMS and mixing at room temperature for 30 min. This solution was then added to the Phenyl-T Resin solution quickly at 108° C. wherein the reaction mixture turns opaque and then clear in 19 minutes. The reaction mixture was then heated at reflux for about 3 hours and 15 minutes. Then, 50/50 MTA/ETA (22.63 g, 0.0979 mols Si) was added to the reaction mixture and heated at reflux for 1 hour. Then the solution was cooled to 100° C. and DI water (36.1 g) was added. Subsequently, the solution was heated at 88-90° C. for 30 min and then heated at reflux to remove water via azeotropic distillation. The solution was then left overnight at room temperature heated at reflux for 2 hours and then cooled to 100° C. To reduce the acetic acid level, 126.8 g of DI water was then added and water was azeotropically removed over a 3.25 hr time period. An additional amount of DI water (162.8 g) was then added and azeotropically removed over a 4.75 hr time period. Pre-dried Darco G60 carbon black (10 g) was then added and the solution was cooled to room temperature with stirring and then allowed to stir overnight at room temperature. The solution was then pressure filtered through a 0.45 µm filter to yield an organosiloxane block copolymer having the formula $D^{Me2}_{0.815}T^{Alkyl}_{0.017}T^{Ph}_{0.168}$, wherein OZ=6.56 mol %, as confirmed by $^{29}$Si NMR.

Example 3

Reagents

| | | |
|---|---|---|
| Phenyl-T Resin (FW = 137 g/mol Si) | 6.880 mols Si | 942.5 g |
| OH-PDMS-OH (FW = 74.3 g/mol Si) ~1.09 mol % OH | 24.62 mols Si 0.2684 mols OH | 1829.0 g |
| Methyl tris(methylethylketoxime)silane (MTO) MW = 301.46 | 0.2820 mols | 85.0 g |
| Toluene | | 5147.9 g |
| n-butanol | | 276.0 g |

Procedure:

A 12 L 3-neck round bottom flask was charged with toluene (3803.9 g)+Phenyl-T Resin (942.5 g). The flask is equipped with a thermometer, Teflon stir paddle, and a Dean Stark apparatus attached to a water-cooled condenser. A nitrogen blanket was applied. The Dean Stark apparatus was prefilled with toluene. A heating mantle was used for heating. The solution was heated at reflux for 30 minutes and then cooled to 108° C. (pot temperature). A solution of toluene (1344 g)+OH-PDMS-OH (1829.0 g) was then capped with MTO in a 5 L 3neck round bottom flask in a nitrogen atmosphere and mixed at RT for 2 hrs. Subsequently, this solution was added to the Phenyl-T Resin at 110° C. This reaction mixture was initially opaque, but then turns clear within 2 min. The reaction mixture was heated at reflux for 2 hrs 10 min. An amount of n-butanol (276.0 g) was then added and the solution was heated at reflux for 3 hours. Toluene (2913 g) was then distilled off to increase a solids content to ~50%. A vacuum at 65-75° C. pot temperature for ~2.5 hrs was then applied. The solution was then filtered through a 5.0 µm filter after setting for 3 days to yield an organosiloxane block copolymer having the formula $D^{Me2}_{0.774}T^{Me}_{0.009}T^{Ph}_{0.217}$, wherein OZ=6.23 mol %, as confirmed by $^{29}$Si NMR.

After formation of the compositions of Examples 1-3, samples of each were evaluated to determine color, refractive index, and tensile strength at break, both before and after heat ageing. Samples of PMMA, as a standard industrial comparative example, were also evaluated to determine the same properties both before and after heat ageing. The results of these determinations are set forth below.

| | Example 1 | Example 2 | Example 3 | PMMA (Comp) |
|---|---|---|---|---|
| Before Heat Ageing | | | | |
| Color | None | None | Low | Low |
| Refractive Index | 1.558 | 1.441 | 1.449 | 1.490 |
| Tensile Strength at Break (MPa) | 4 | 2.5 | 4.8 | 71 |
| After Heat Ageing (1000 hrs at 225° C. - Forced Air Oven) | | | | |
| Color | None | None | Low | Low |
| Refractive Index | 1.558 | 1.441 | 1.449 | N/A* |
| Tensile Strength at Break (MPa) | 4.5 | 7.4 | 4.7 | N/A* |

-continued

|  | Example 1 | Example 2 | Example 3 | PMMA (Comp) |
|---|---|---|---|---|
| Transmission (%) | 97 | 98 | — | N/A* |
| Haze (%) | 4.1 | — | — | N/A* |

*N/A indicates that sample unable to be tested due to physical degradation

Color is evaluated by visual inspection and comparison to conventional cured PDMS, such as Sylgard 184.

Refractive Index is evaluated using a Metricon 2010 prism coupler, using a HeNe laser source at 632.8 nm, and operating in 'bulk index' mode.

Tensile Strength at break is evaluated using ASTM D412.

Transmission is evaluated using the formulas described above.

Haze is evaluated using ASTM D1003.

The data set forth above clearly indicates that the compositions of Examples 1-3 of this disclosure outperform PMMA after heat ageing. More specifically, the PMMA entirely degrades to such an extent that further physical property testing cannot be completed. As applied to articles, such as those that include LEDs, the PMMA cannot be effectively used in direct contact with heated light sources or in high heat environments. The compositions of this disclosure can be used in such environments and outperform the PMMA.

One or more of the values described above may vary by ±5%, ±10%, ±15%, ±20%, ±25%, etc. so long as the variance remains within the scope of the disclosure. Unexpected results may be obtained from each member of a Markush group independent from all other members. Each member may be relied upon individually and or in combination and provides adequate support for specific embodiments within the scope of the appended claims. The subject matter of all combinations of independent and dependent claims, both singly and multiply dependent, is herein expressly contemplated. The disclosure is illustrative including words of description rather than of limitation. Many modifications and variations of the present disclosure are possible in light of the above teachings, and the disclosure may be practiced otherwise than as specifically described herein.

What is claimed is:

1. A light assembly, comprising:
  a light source; and
  a light guide, comprising an organosiloxane block copolymer and having a first surface configured to receive light from the light source and a second surface configured to emit light transmitted along a length of the light guide;
  wherein:
  the organosiloxane block copolymer has a weight average molecular weight of at least 20,000 g/mole and comprises:
  40 to 90 mole percent disiloxy units of the formula $[R^1_2SiO_{2/2}]$ arranged in linear blocks each having an average of from 10 to 400 disiloxy units $[R^1_2SiO_{2/2}]$ per linear block;
  10 to 60 mole percent trisiloxy units of the formula $[R^2SiO_{3/2}]$ arranged in non-linear blocks each having a weight average molecular weight of at least 500 g/mol; and
  0.5 to 25 mole percent silanol groups [≡SiOH];
  wherein each $R^1$, at each occurrence is independently a $C_1$ to $C_{30}$ hydrocarbyl and each $R_2$, at each occurrence, is independently a $C_1$ to $C_{20}$ hydrocarbyl,
  wherein at least 30% of the non-linear blocks are crosslinked with another non-linear block and aggregated in nano-domains, and
  wherein each linear block is crosslinked to at least one non-linear block.

2. The light assembly of claim 1, wherein the first surface forms an indentation configured to admit, at least in part, the light source.

3. The light assembly of claim 1, wherein the light guide is formed into an irregular three-dimensional shape.

4. The light assembly of claim 1, wherein the light source comprises a light emitter and a protective member.

5. A light guide, comprising:
  an organosiloxane block copolymer formed into an irregular three-dimensional shape having a first surface configured to receive light and a second surface configured to emit light transmitted a length of the light guide, the block copolymer having a thermal stability such that it has less than 5 wt. % total weight loss, over 700 minutes of exposure to 250° C. in an air atmosphere, a transmission of greater than about 95 percent corrected for surface reflection, a refractive index greater than about 1.4, and less than about 10 haze percent;
  wherein:
  the organosiloxane block copolymer has a weight average molecular weight of at least 20,000 g/mole and comprises:
  40 to 90 mole percent disiloxy units of the formula $[R^1_2SiO_{2/2}]$ arranged in linear blocks each having an average of from 10 to 400 disiloxy units $[R^1_2SiO_{2/2}]$ per linear block;
  10 to 60 mole percent trisiloxy units of the formula $[R^2SiO_{3/2}]$ arranged in non-linear blocks each having a weight average molecular weight of at least 500 g/mol; and
  0.5 to 25 mole percent silanol groups [≡SiOH];
  wherein each $R^1$, at each occurrence is independently a $C_1$ to $C_{30}$ hydrocarbyl
  and each $R_2$, at each occurrence, is independently a $C_1$ to $C_{20}$ hydrocarbyl,
  wherein at least 30% of the non-linear blocks are crosslinked with another non-linear block and aggregated in nano-domains, and
  wherein each linear block is linked to at least one non-linear block.

6. The light guide of claim 5, wherein the irregular three-dimensional shape comprises a bend; a prism; a wedge; a bend and a prism; a bend and a wedge; or a bend, a prism, and a wedge.

7. The light guide of claim 5, wherein the irregular three-dimensional shape comprises a first cross section proximate the first surface and a second cross section proximate the second surface, the first cross section different from the second cross section.

8. The light guide of claim 5, wherein the light guide comprises a plurality of first surfaces configured to receive light.

9. The light guide of claim 8, further comprising a plurality of light sources.

10. The light guide of claim 5, further comprising a plurality of light sources configured to emit light received, at least in part, by the first surface.

11. The light guide of claim 5, further comprising a plurality of second surfaces configured to emit light transmitted a length of the light guide.

12. The light guide of claim 5, wherein the second surface is a diffused exit.

13. The light guide of claim 5, wherein said organosiloxane block copolymer comprises a gradient of disiloxy units and trisiloxy units; a gradient of disiloxy units, trisiloxy units, and silanol groups; a gradient of trisiloxy units and silanol groups; or a gradient of disiloxy units and silanol groups.

14. The light guide of claim 13, wherein said disiloxy units have the formula $[(CH_3)(C_6H_5)SiO_{2/2}]$.

15. The light guide of claim 13, wherein said organosiloxane block copolymer comprises at least 30 weight percent disiloxy units.

16. The light guide of claim 13, wherein $R^2$ is phenyl.

17. The light guide of claim 5, wherein said organosiloxane block copolymer has a tensile strength greater than 1.0 MPa and a % elongation at break greater than 20%, each independently determined according to ASTM D412; wherein said organosiloxane block copolymer has a melt flow temperature of from 25° C. to 200° C.; or wherein said organosiloxane block copolymer has: a storage modulus (G') at 25° C. of from 0.01 MPa to 500 MPa and a loss modulus (G") at 25° C. of from 0.001 MPa to 250 MPa; a storage modulus (G') at 120° C. of from 10 Pa to 500,000 Pa and a loss modulus (G") at 120° C. of from 10 Pa to 500,000 Pa; or a storage modulus (G') at 200° C. of from 10 Pa to 100,000 Pa and a loss modulus (G") at 200° C. of from 5 Pa to 80,000 Pa.

18. A method for making the light guide of claim 5, the method comprising forming the organosiloxane block copolymer.

19. An article comprising a light source and a light guide disposed on said light source, said light guide having a transmission of greater than 90 percent corrected for surface reflection, a refractive index greater than 1.4, and less than 10 haze percent, and comprising an organosiloxane block copolymer having a weight average molecular weight of at least 20,000 g/mole and comprising:

40 to 90 mole percent disiloxy units of the formula $[R^1_2SiO_{2/2}]$ arranged in linear blocks each having an average of from 10 to 400 disiloxy units $[R^1_2SiO_{2/2}]$ per linear block;

10 to 60 mole percent trisiloxy units of the formula $[R^2SiO_{3/2}]$ arranged in non-linear blocks each having a weight average molecular weight of at least 500 g/mol; and 0.5 to 25 mole percent silanol groups [≡SiOH];

wherein $R^1$ is independently a $C_1$ to $C_{30}$ hydrocarbyl and $R^2$ is independently a $C_1$ to $C_{20}$ hydrocarbyl, wherein at least 30% of the non-linear blocks are crosslinked with another non-linear block and aggregated in nano-domains, and wherein each linear block is linked to at least one non-linear block.

\* \* \* \* \*